United States Patent
Nam et al.

(10) Patent No.: US 12,447,452 B2
(45) Date of Patent: Oct. 21, 2025

(54) COMBINED REFORMER AND CATALYST REPLACEMENT METHOD THEREOF

(71) Applicant: DOOSAN ENERBILITY CO., LTD., Changwon-si (KR)

(72) Inventors: Gyeong Mo Nam, Yongin (KR); Bong Keun Kim, Yongin (KR); Su Nam You, Yongin (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 231 days.

(21) Appl. No.: 18/366,778

(22) Filed: Aug. 8, 2023

(65) Prior Publication Data
US 2024/0050910 A1    Feb. 15, 2024

(30) Foreign Application Priority Data

| Aug. 12, 2022 | (KR) | 10-2022-0101497 |
| Aug. 12, 2022 | (KR) | 10-2022-0101498 |
| Jun. 20, 2023 | (KR) | 10-2023-0079218 |
| Jun. 20, 2023 | (KR) | 10-2023-0079219 |

(51) Int. Cl.
*B01J 6/00* (2006.01)
*B01J 8/00* (2006.01)
*B01J 8/02* (2006.01)
*B01J 8/04* (2006.01)
*B01J 8/06* (2006.01)

(52) U.S. Cl.
CPC .............. *B01J 6/008* (2013.01); *B01J 8/001* (2013.01); *B01J 8/0242* (2013.01); *B01J 8/0285* (2013.01); *B01J 8/0449* (2013.01); *B01J 8/0465* (2013.01); *B01J 8/0492* (2013.01); *B01J 8/0496* (2013.01); *B01J 8/062* (2013.01);
(Continued)

(58) Field of Classification Search
CPC .... B01J 2208/00168; B01J 2208/00194; B01J 2208/00238; B01J 2208/00504; B01J 2208/00769; B01J 2208/065; B01J 2219/00081; B01J 3/042; B01J 6/008; B01J 8/001; B01J 8/0015; B01J 8/0242; B01J 8/0285; B01J 8/0449; B01J 8/0465; B01J 8/0484; B01J 8/0492; B01J 8/0496; B01J 8/062; B01J 8/067; C01B 3/326
See application file for complete search history.

(56) References Cited

U.S. PATENT DOCUMENTS

2008/0247942 A1 * 10/2008 Kandziora ............... B01J 8/062
422/198

FOREIGN PATENT DOCUMENTS

| KR | 20140120070 A | * | 10/2014 |
| KR | 101721947 B1 | * | 3/2017 |

(Continued)

OTHER PUBLICATIONS

KR101721947B1 English Translation (Year: 2017).*
(Continued)

*Primary Examiner* — Ellen M McAvoy
*Assistant Examiner* — Chantel Graham
(74) *Attorney, Agent, or Firm* — Harvest IP Law, LLP

(57) ABSTRACT

Disclosed is a combined reformer including two or more catalyst tubes reacting at different temperatures, having different reforming reactions continuously performed as a combustion gas sequentially supplies heat to two or more catalyst tubes, and capable of easily replacing a catalyst, and a catalyst replacement method thereof.

19 Claims, 18 Drawing Sheets

(52) U.S. Cl.
CPC ............... *B01J 2208/00504* (2013.01); *B01J 2208/065* (2013.01); *B01J 2219/00081* (2013.01)

(56) References Cited

FOREIGN PATENT DOCUMENTS

| KR | 20190051106 A | * | 5/2019 |
| KR | 102358839 B1 | * | 2/2022 |

OTHER PUBLICATIONS

KR102358839B1 (Year: 2022).*
KR20140120070A English Translation (Year: 2014).*
KR20190051106A English Translation (Year: 2019).*

* cited by examiner

COMBINED REFORMER AND CATALYST REPLACEMENT METHOD THEREOF

The present application claims priority to Korea Patent Application No. 10-2022-0101497, filed on Aug. 12, 2022, Korea Patent Application No. 10-2022-0101498, filed on Aug. 12, 2022, Korea Patent Application No. 10-2023-0079218, filed on Jun. 20, 2023, and Korea Patent Application No. 10-2023-0079219, filed on Jun. 20, 2023, the entire contents of which is incorporated herein for all purposes by this reference.

FIELD

Apparatuses and methods consistent with exemplary embodiments relate to a combined reformer and a catalyst replacement method thereof, and more particularly, to a combined reformer including two or more catalyst tubes reacting at different temperatures, having different reforming reactions continuously performed as a combustion gas sequentially supplies heat to two or more catalyst tubes, and capable of easily replacing a catalyst, and a catalyst replacement method thereof.

BACKGROUND

A related art steam methane reforming apparatus (SMR) is an apparatus for reforming natural gas containing methane ($CH_4$) as a main component. The related art steam methane reformer has a problem in that the structure and process are complicated because it requires a preliminary reformer to convert the high carbon-number hydrocarbons into methane when reforming a gas containing a hydrocarbon (CxHy) having a high carbon number.

SUMMARY

An object of the present disclosure is to provide a combined reformer including two or more catalyst tubes reacting at different temperatures, having different reforming reactions continuously performed as a combustion gas sequentially supplies heat to two or more catalyst tubes, and capable of easily replacing a catalyst, and a catalyst replacement method thereof.

The technical problem to be achieved by the present disclosure is not limited to the above-mentioned technical problem, and other technical problems that are not mentioned will be clearly understood by ordinary-skilled persons in the art to which the present disclosure pertains from the following description.

One embodiment is a combined reformer, including: a body; a first catalyst tube disposed inside the body and reacting at a first temperature; a second catalyst tube disposed inside the body and reacting at a second temperature higher than the first temperature; a connection tube connecting the first catalyst tube and the second catalyst tube to each other; and a combustion unit configured to supply heat to the first catalyst tube and the second catalyst tube, and wherein a portion of the first catalyst tube, a portion of the second catalyst tube, and the connection tube may be detachably installed on an outer surface of the body from an outside of the body.

According to the embodiment, the portion of the first catalyst tube, the portion of the second catalyst tube, and the connection tube may be fixed to each other so as to be integrally separable from the body.

According to the embodiment, a remaining portion of the first catalyst tube and a remaining portion of the second catalyst tube may be disposed inside the body and may be detachably installed in the body, respectively.

According to the embodiment, a first tube part of the first catalyst tube disposed inside the body may include a first flange, and a second tube part of the first catalyst tube disposed outside the body comprises a second flange, and the first flange and the second flange may be detachably coupled to the body.

According to the embodiment, the first flange may be coupled to an upper outer surface of the body, and the second flange may be coupled to an upper surface of the first flange.

According to the embodiment, a sealing part may be provided between an upper outer surface of the body and the first flange, and between the upper surface of the first upper flange and the second flange.

According to the embodiment, wherein on the upper outer surface of the body, a first threaded part is protrudingly formed and inserted into a first coupling hole formed in the first flange, and on the upper surface of the first flange, a second threaded part is protrudingly formed and inserted into a second coupling hole formed in the second flange.

According to the embodiment, a first fastening hole through which a first bolt passes may be formed in the first flange, a first fastening groove may be formed on the upper outer surface of the body to be aligned with the first fastening hole, a second fastening hole through which a second bolt passes may be formed in the second flange, and a second fastening groove may be formed on the upper surface of the first flange to be aligned with the second fastening hole.

According to the embodiment, the first tube part of the first catalyst tube may be a U-shaped tube, and the second tube part of the first catalyst tube may be a straight tube connected to a discharge end of the U-shaped tube.

According to the embodiment, the combined reformer may further include: an inlet tube connected to an inlet end of the U-shaped tube and detachably installed in the body.

According to the embodiment, a third tube part of the second catalyst tube disposed inside the body may include a third flange, and a fourth tube part of the second catalyst tube disposed outside the body may include a fourth flange, and the third flange and the fourth flange may be detachably coupled to the body.

According to the embodiment, the third flange may be coupled to the upper outer surface of the body, and the fourth flange may be coupled to an upper surface of the third flange.

According to the embodiment, a sealing part may be provided between an upper outer surface of the body and the third flange, and between the upper surface of the third flange and the fourth flange.

According to the embodiment, wherein, on the upper outer surface of the body, a third threaded part is protrudingly formed and inserted into a third coupling hole formed in the third flange, and, on the upper surface of the third flange, a fourth threaded part is protrudingly formed and inserted into a fourth coupling hole formed in the fourth flange.

According to the embodiment, a third fastening hole through which a first bolt passes may be formed in the third flange, a third fastening groove may be formed on the upper outer surface of the body to be aligned with the third fastening hole, a fourth fastening hole through which a second bolt passes may be formed in the fourth flange, and a fourth fastening groove may be formed on the upper surface of the third flange to be aligned with the fourth fastening hole.

According to the embodiment, the second catalyst tube may further include an inner tube disposed on an inside of the third tube part and the fourth tube part, and the inner tube may be fixed to the fourth tube part.

According to the embodiment, the connection tube may be connected to the fourth tube part of the second catalyst tube, and a gas introduced into a space between the fourth tube part and the inner tube of the second catalyst tube through the connection tube may flow into a space between the third tube part and the inner tube of the second catalyst tube, and then may flow into the inner tube.

According to the embodiment, the connection tube may connect the first catalyst tube and the inner tube to each other, and a gas introduced into the inner tube of the second catalyst tube through the connection tube may flow into a space between the third tube part and the inner tube and then may flow into a space between the fourth tube part and the inner tube.

According to the embodiment, the inner tube may extend outward after passing through the fourth tube part.

According to the embodiment, a fin may be provided on an outer surface of the inner tube along a longitudinal direction.

According to the embodiment, a fin may be provided on an outer surface of the third tube part of the second catalyst tube along a longitudinal direction.

According to the embodiment, the second catalyst tube may be positioned on a radially inner side of the body rather than the first catalyst tube, and combustion gas discharged from the combustion unit may be discharged to a center of the body to supply heat to the second catalyst tube, and then supply heat to the first catalyst tube.

According to the embodiment, a hydrocarbon gas supplied to the plurality of first catalyst tubes may include a hydrocarbon having two or more carbon atoms, and in the plurality of first catalyst tubes, the hydrocarbon having two or more carbon atoms may react with steam to be reformed into methane, and in the plurality of second catalyst tubes, methane may react with steam to be reformed into syngas containing hydrogen and carbon monoxide.

According to the embodiment, the hydrocarbon gas supplied to the plurality of first catalyst tubes may include methane and carbon dioxide, and in the plurality of first catalyst tubes, methane may react with steam to be reformed into syngas containing hydrogen and carbon monoxide, and in the plurality of second catalyst tubes, methane may react with carbon dioxide to be reformed into syngas containing hydrogen and carbon monoxide.

Another embodiment is a method for replacing a catalyst of the combined reformer, including: separating a portion of the first catalyst tube, a portion of the second catalyst tube, and the connection tube from the body; separating at least one among a remaining portion of the first catalyst tube and a remaining portion of the second catalyst tube from the body; removing a catalyst from at least one among the remaining portion of the first catalyst tube and the remaining portion of the second catalyst tube separated from the body; coupling at least one among the remaining portion of the first catalyst tube and the remaining portion of the second catalyst tube separated from the body to the body again; coupling the portion of the first catalyst tube, the portion of the second catalyst tube, and the connection tube to the body again; and injecting a catalyst again into the first catalyst tube or the second catalyst tube from which a catalyst has been removed.

According to the present disclosure, two or more catalyst tubes reacting at different temperatures are included in one body and, and different reforming reactions may be continuously performed as a combustion gas sequentially supplies heat to the two or more catalyst tubes. For example, when pyrolysis gas and steam are supplied, hydrocarbons (CxHy) having two or more carbon atoms can be reformed into methane ($CH_4$) by reacting with steam, and at the same time, the methane ($CH_4$) can be reformed into synthesis gas composed of hydrogen ($H_2$) and carbon monoxide (CO) by reacting with steam. Accordingly, there is no need to additionally install a preliminary reformer, thereby simplifying the structure and process for gas reforming. As another example, when biogas and steam are supplied, methane can be reformed into syngas by reacting with steam (wet reforming), and at the same time methane can be reformed into syngas by reacting with carbon dioxide (dry reforming). In this case, there is no need to separately remove carbon dioxide from biogas before supplying it to the reformer, and a device for removing carbon dioxide is not required.

In addition, since a portion of a first catalyst tube, a portion of a second catalyst tube, and a connection tube are detachably installed in the body from an outside of the body, there is no need to open an upper portion of the body to separate the entire catalyst tube for catalyst replacement. That is, since it is possible to separate only the first catalyst tube or the second catalyst tube without opening the upper portion of the body, the catalyst can be easily replaced.

Effects which may be obtained by the present invention are not limited to the aforementioned effects, and other technical effects not described above may be evidently understood by a person having ordinary skill in the art to which the present invention pertains from the following description.

DETAILED DESCRIPTION

Figure 1:
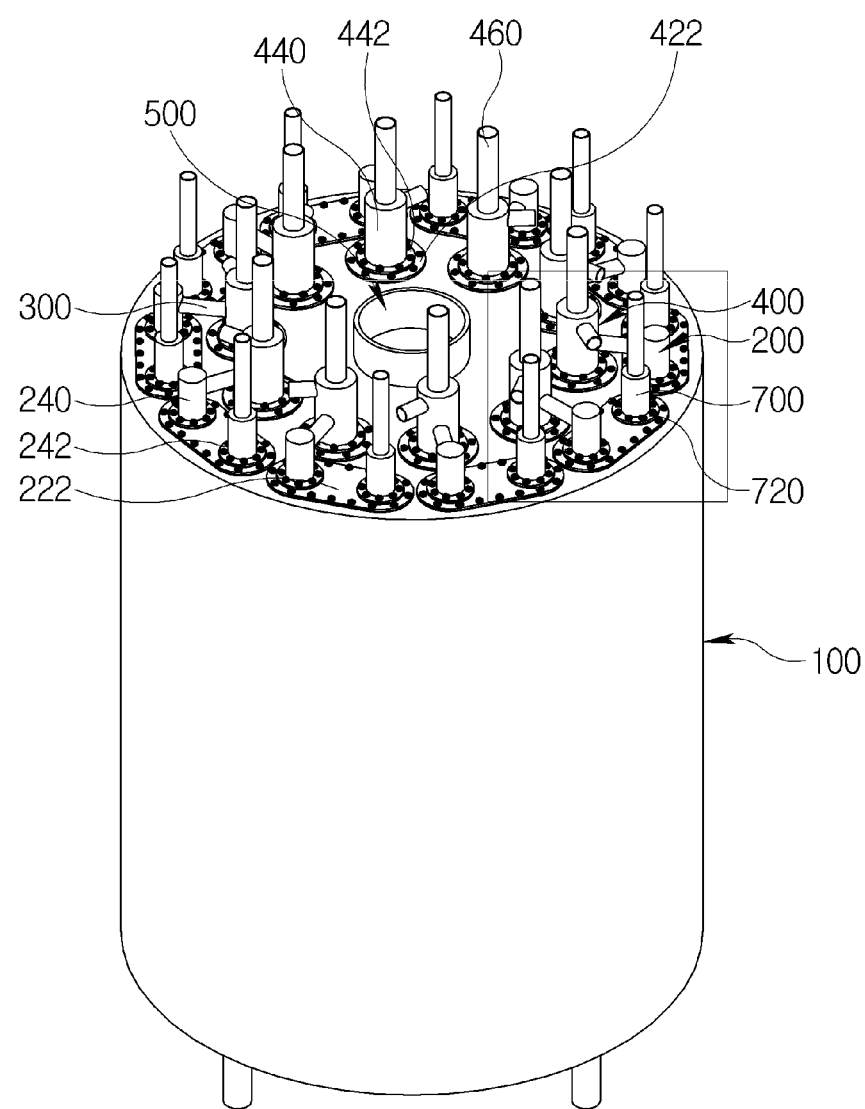
FIG. 1 is a perspective view illustrating a combined reformer according to a first embodiment of the present disclosure.

Hereinafter, various embodiments of a combined reformer according to the present disclosure will be described with reference to the accompanying drawings.

In addition, terms used herein are defined in consideration of functions in the present disclosure, and may vary according to user's or operator's intention or practices, and the following embodiments do not limit the scope of the present disclosure, but are merely examples of the components presented in the claims.

For clear illustration, components that are irrelevant to the description are omitted, and like reference numerals refer to like components throughout the specification. Throughout the specification, it will also be understood that the terms "comprises", "includes", and "has" used herein specify the presence of stated elements, but do not preclude the presence or addition of other elements, unless otherwise defined.

First, with reference to FIGS. 1 to 5, a combined reformer according to the first embodiment of the present disclosure will be described.

The combined reformer according to the first embodiment of the present disclosure includes a body 100, a first catalyst tube 200, a connection tube 300, a second catalyst tube 400, and a combustion unit 500.

The body 100 is formed in a cylindrical shape having an inner space and defines an external shape of the combined reformer, but is not limited thereto.

Two or more catalyst tubes reacting at different temperatures are disposed in the body 100. Specifically, a first catalyst tube 200 reacting at a first temperature T1 and a second catalyst tube 400 reacting at a second temperature T2 higher than the first temperature T1 are provided in the body 100. The first temperature T1 and the second temperature T2 may be set differently based on reactions occurring in the first catalyst tube 200 and the second catalyst tube 400.

In the present embodiment, the process is explained in following context: A hydrocarbon gas containing hydrocarbons having a carbon number of two or more and steam are fed into the first catalyst tube 200. Within the first catalyst tube 200, the hydrocarbons having a carbon number of two or more undergo a reforming reaction with steam, resulting in the formation of methane. Subsequently, the methane generated in the first catalyst tube 200 reacts with steam in the second catalyst tube 400, leading to its reforming into syngas containing hydrogen and carbon monoxide.

The first temperature T1, which is the reaction temperature of the first catalyst tube 200, can range from about 350° C. to 550° C. In this process, a catalyst designed for reforming hydrocarbons having two or more carbon atoms is used. For example, the first catalyst tube 200 can utilize a nickel-based catalyst supported by MgO or $Al_2O_3$ or a combination thereof. Therefore, in the first catalyst tube 200, higher hydrocarbons having two or more carbon atoms, such as ethane, propane, and butane, may be converted into methane, carbon monoxide, and hydrogen through reactions represented by Reaction Formulas 1 and 2 below.

$C_nH_m + nH_2O \rightarrow nCO + (n+m/2)H_2$  Reaction Formula 1

$CO + 3H_2 \rightarrow CH_4 + H_2O$  Reaction Formula 2

The second temperature T2, which is the reaction temperature of the second catalyst tube 400, can range from about 700° C. to 900° C. In this process, a catalyst designed for reforming methane is used. For example, a nickel-based catalyst may also be used for the second catalyst tube 400. Therefore, in the second catalyst tube 400, methane may be converted into synthesis gas mainly composed of hydrogen and carbon monoxide through a reaction represented by Reaction Formula 3 below.

$CH_4 + H_2O \rightarrow CO + 3H_2$  Reaction Formula 3

Here, although the wet reforming reaction of methane has been described as being performed in the second catalyst tube 400, since the wet reforming reaction of methane may occur in a wide temperature range, the wet reforming reaction thereof may also be partially carried out in the first catalyst tube 200.

The first catalyst tube 200 and the second catalyst tube 400 are connected to each other via the connection tube 300. This arrangement allows for sequential flow of hydrocarbon gas and steam supplied to the first catalyst tube 200 sequentially flow through the first catalyst tube 200, the connection tube 300, and finally, the second catalyst tube 400.

Accordingly, although the hydrocarbon gas supplied to the first catalyst tube 200 contains a large amount of hydrocarbon having two or more carbon atoms, the hydrocarbon gas can undergo steam reforming reactions to be reformed into synthesis gas while passing through the first catalyst tube 200 and subsequently the second catalyst tube 400 in sequence. That is, higher hydrocarbons having two or more carbon atoms may be converted into methane while passing through the first catalyst tube 200, and the methane may be converted into synthesis gas while passing through the second catalyst tube 400. For example, the hydrocarbon gas supplied to the first catalyst tube 200 may be a pyrolysis gas generated through pyrolysis of wastes. For example, the hydrocarbon gas may be a pyrolysis gas generated by pyrolysis process of waste plastics. This pyrolysis gas is likely to contain a large amount of hydrocarbon having two or more carbon atoms. Despite the higher content of such hydrocarbons, the pyrolysis gas can still be reformed into synthesis gas via the sequential passage through the first catalyst tube 200 and the second catalyst tube 400 utilizing steam reforming reactions.

The combustion unit 500 for supplying heat to the first catalyst tube 200 and the second catalyst tube 400 is installed in the center of the body 100. According to an embodiment, the combustion unit 500 may be installed in an upper center of the body 100. In the combustion unit 500, the hydrocarbon gas is combusted to generate combustion gas. The generated combustion gas is discharged to the center of the body 100.

Because the second catalyst tube 400 reacts at a higher temperature than the first catalyst tube 200, it is preferable that the combustion gas discharged from the combustion unit 500 first supplies heat to the second catalyst tube 400 and then supplies heat to the first catalyst tube 200. To this end, the second catalyst tube 400 is positioned on a radially inner side of the body 100, as opposed to the first catalyst tube 200. In the present embodiment, the first catalyst tube 200 consists of a plurality of the first catalyst tubes 200 and the second catalyst tube 400 consists of a plurality of the second catalyst tubes 400. Each of the plurality of the first catalyst tubes 200 and each of the plurality of the second catalyst tube 400 is spaced apart from each other and positioned in a circumferential direction of the body 100. In addition, each of the plurality of the first catalyst tubes 200 and each of the plurality of the second catalyst tube 400 extend vertically along a longitudinal direction of the body 100. Throughout the specification, an upward or upper direction and a downward or lower direction are defined based on the longitudinal direction and the downward or lower direction is an opposite direction of the upward or upper direction.

However, it is not limited thereto, and the first catalyst tube 200 may be positioned on a radially inner side of the body 100 as opposed to the second catalyst tube 400, so that the combustion gas supplies heat to the second catalyst tube 400 after the combustion gas supplies heat to the first catalyst tube 200 according to an embodiment.

Figure 2:
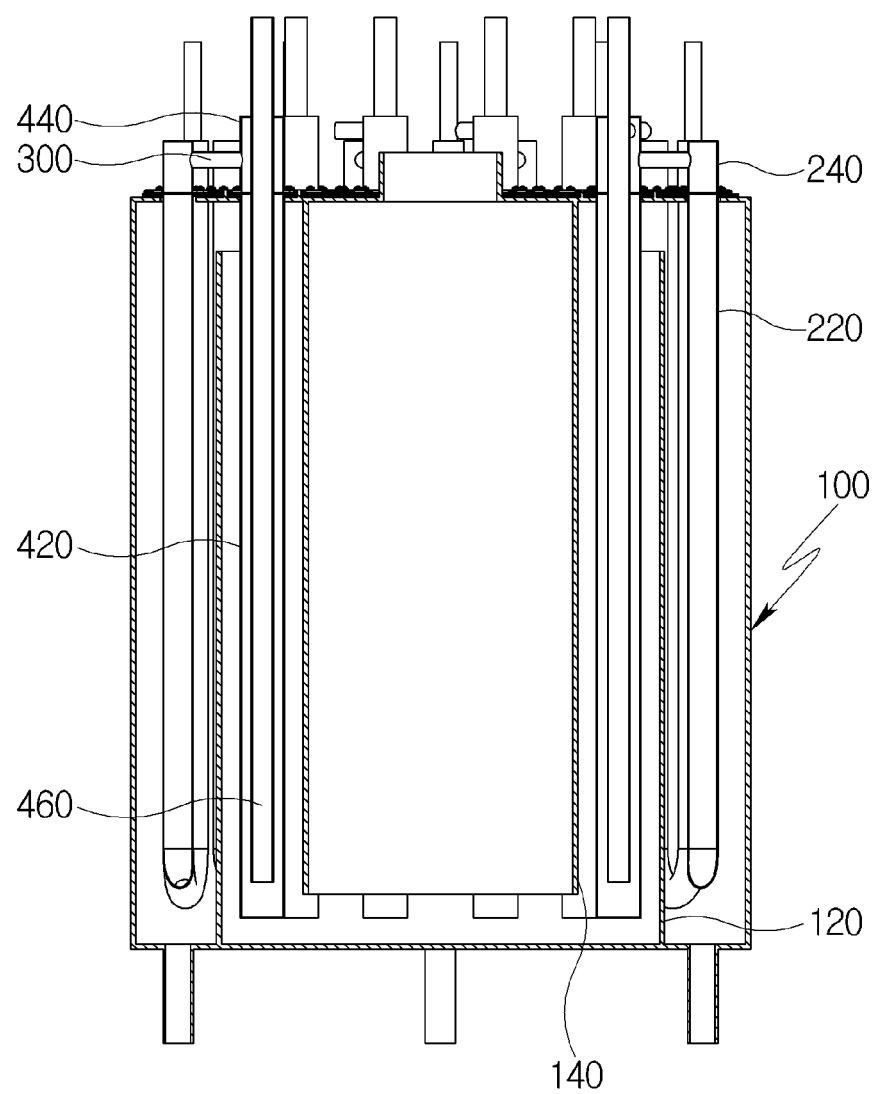
FIG. 2 is a vertical cross-sectional view of FIG. 1.

In further elaboration of the present embodiment in details, as illustrated in FIGS. 1 and 2, there are ten second catalyst tubes 400, evenly spaced apart from each other at uniform intervals in the circumferential direction of the body 100. In addition and similarly, there are ten first catalyst tubes 200, evenly spaced apart from each other in the circumferential direction of the body 100. The ten first catalyst tubes 200 are disposed to surround second catalyst tubes 400. The connection tube 300 consist of ten connection tubes 300, each of which serves to connect the first catalyst tubes 200 and the second catalyst tubes 400 to one another. However, the number of the catalyst tubes and the connection tubes may be less than or more than ten, varying depending on a scale of a reforming apparatus, and the like.

Inside the body 100, a first wall 120 and a second wall 140 may be formed to guide a flow of the combustion gas discharged from the combustion unit 500 so as to effectively supply heat to the first catalyst tube 200 and the second catalyst tube 400. The first wall 120 may be provided between the first catalyst tube 200 and the second catalyst tube 400, and extend vertically upward from the lower side of the body 100. The first wall 120 may be formed such that there is a space or a gap between the upward end of the first wall 120 and an upper side of the body 100. In addition, the second wall 140 may be provided on a radially inner side of the second catalyst tube 400, and extends vertically downward from the upper side of the body 100. The second wall 140 may be formed such that there is a space or a gap between the downward end of the second wall 140 and the lower side of the body. The lower side means a lower end plate of the body 100 and the upper side means an upper end plate of the body 100. The first wall 120 and the second wall 140 may be in a cylindrical shape, sharing the same radial center as the body 100. Accordingly, the combustion gas discharged from the combustion unit 500 flows in a zigzag direction along the longitudinal direction of the second catalyst tube 400 and the first catalyst tube 200 in sequence. This arrangement allows to supply sufficient heat to the first and second catalyst tubes 200 and 400 and generating a temperature gradient in the first and second catalyst tubes 200 and 400 according to the reaction temperature.

Specifically, as illustrated in FIG. 2, the combustion gas discharged from the combustion unit 500 flows downward. It passes, in a radially outward direction, through a space beneath the second wall 140 located between the downward end of the second wall 140 and the lower end plate of the body 100. After the combustion gas proceeds toward the second catalyst tube 400, it changes its direction, flowing upward. During this upward move, the combustion gas supplies heat to the second catalyst tubes 400. Then, the combustion gas whose temperature is slightly lowered thereafter moves, in the radially outward direction, toward the first catalyst tube 200 through a space above the first wall 120 between the first wall 120 and the upper end plate of the body 100. After the combustion gas proceeds toward the first catalyst tube 200, then it flows downward to supply heat to the first catalyst tubes 200. After supplying heat to the second catalyst tubes 400 and the first catalyst tube 200, the combustion gas is discharged to the outside by a combustion gas discharge unit (not illustrated) included in the body 100.

Here, in the present disclosure, a portion of the first catalyst tube 200, a portion of the second catalyst tube 400, and the connection tube 300 are detachably installed in the body 100 from an outside of the body 100. In addition, the remaining portion of the first catalyst tube 200 and the remaining portion of the second catalyst tube 400 are disposed inside the body and are detachably installed in the body 100, respectively.

That is, the first catalyst tube 200 is not only disposed inside the body 100, but also extends vertically outward from the body 100. Thus, the first catalyst tube 200 includes two parts: a first tube part 220 located inside the body 100, and a second tube part 240 located outside the body 100. Likewise, the second catalyst tube 400 is not only disposed inside the body 100, but also extends vertically outward from the body 100, and includes two parts: a third tube part 420 disposed inside the body 100 and a fourth tube part 440 disposed outside the body 100.

Figure 3:
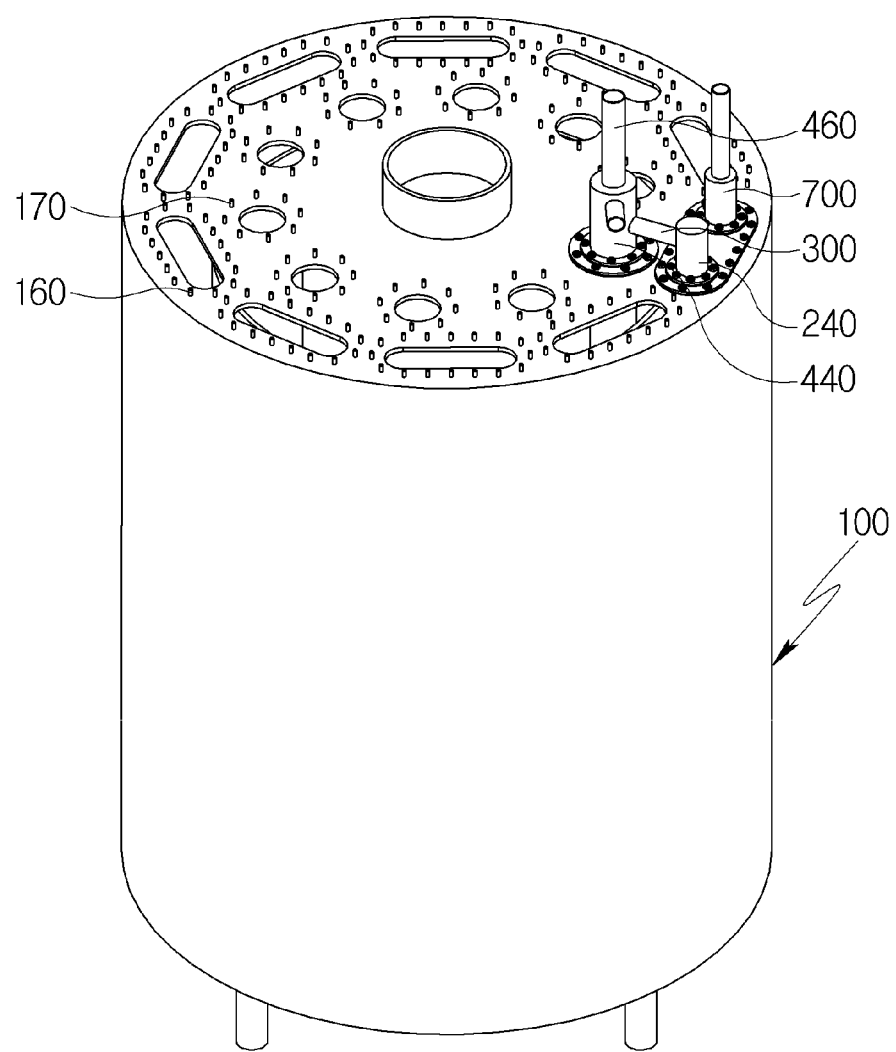
FIG. 3 is a perspective view illustrating a state where only a first catalyst tube and a second catalyst tube connected to each other in FIG. 1 are installed in a body.

To this end, as illustrated in FIG. 3, the body 100, more precisely, the upper side of the body 100, is formed with a plurality of holes through which the first catalyst tube 200, more precisely, the first tube part 220 of the first catalyst tube, and the second catalyst tube 400, more precisely, the third tube part 420 of the second catalyst tube pass.

Here, the connection tube 300 connects the second tube part 240 of the first catalyst tube and the fourth tube part 440 of the second catalyst tube to each other in the outside of the body 100, more precisely, in the above of the body 100. The second tube part 240 of the first catalyst tube, the fourth tube part 440 of the second catalyst tube, and the connection tube 300 may be formed such that they are fixed to each other and are integrally detachable from the body 100.

First, a structure where the first catalyst tube 200 is detachably installed in the body 100 will be described. The first tube part 220 includes a first flange 222, the second tube part 240 includes a second flange 242. Each of the first flange 222 and the second flange 242 is detachably coupled to the body 100. As illustrated in FIG. 1, the first flange 222 is coupled to an upper outer surface of the body 100 (i.e., an outer surface of the upper end plate of the body 100), and the second flange 242 is detachably coupled to an upper surface of the first flange 222. The first flange 222 may have a larger area than the second flange 242. The first flange 222 may be referred to as a first-tube-part flange 222 and the second flange 242 may be referred to as a second-tube-part flange 242.

Figure 5:
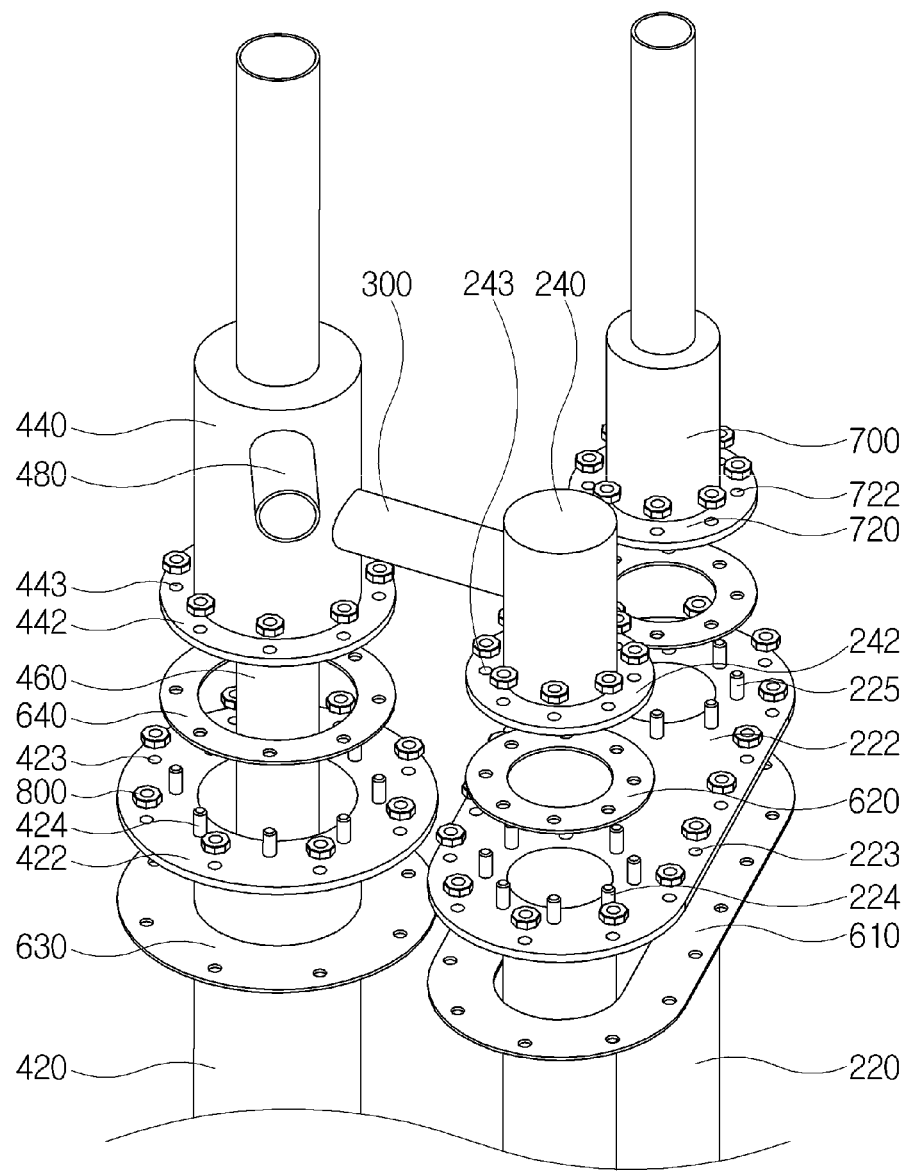
FIG. 5 is an enlarged exploded perspective view illustrating a state in which configurations in FIG. 4 are separated.

To this end, as illustrated in FIGS. 3 and 5, on the upper outer surface of the body 100, a first threaded part 160 is protrudingly formed, which is inserted into a first coupling hole 223. This first coupling hole 223 is formed in the first flange 222. On the upper surface of the first flange 222, a second threaded part 224 is protrudingly formed, which is inserted into a second coupling hole 243. This second coupling hole 243 is formed in the second flange 242. As a result, the first flange 222 is seated on the body 100 (or, on the upper end plate of the body 100) such that the first threaded part 160 is inserted through the first coupling hole 223, and the second flange 242 is seated on the first flange 222 such that the second threaded part 224 is inserted through the second coupling hole 243. Thereafter, the first tube part 220 may be detachably coupled to the body 100, and the second tube part 240 may be detachably coupled to the first tube part 220, respectively, by nuts 800, which are fixed to each of the threaded parts 160 and 224.

Here, a first sealing part 610 may be provided between the upper outer surface of the body 100 and the first flange 222, and a second sealing part 620 may be provided between the upper surface of the first flange 222 and the second flange 242. The first sealing part 610 and the second sealing part 620 may prevent gas leakage.

Next, a structure in which the second catalyst tube 400 is detachably installed in the body 100 will be described. The third tube part 420 includes a third flange 422, the fourth tube part 440 includes a fourth flange 442. Each of the third flange 422 and the fourth flange 442 is detachably coupled to the body 100. As illustrated in FIG. 1, the third flange 422 is coupled to an upper outer surface of the body 100 (i.e., an outer surface of the upper end plate of the body 100), and the fourth flange 442 is detachably coupled to an upper surface of the third flange 422. The third flange 422 may have a larger area than the fourth flange 442. The third flange 422 may be referred to as a third-tube-part flange 422 and the fourth flange may be referred to as a fourth-tube-part flange 442.

To this end, as illustrated in FIGS. 3 and 5, on the upper surface of the body 100, a third threaded part 170 is protrudingly formed, which is inserted into a third coupling hole 423. This third coupling hole 423 is formed in the third flange 422. On the upper surface of the third flange 422, a fourth threaded part 424 is protrudingly formed, which is inserted into a fourth coupling hole 443. This fourth coupling hole 443 is formed in the fourth flange 442. As a result, the third flange 422 is seated on the body 100 (or, on the upper end plate of the body 100) such that the third threaded part 170 is inserted through the third coupling hole 423, and the fourth flange 442 is seated on the third flange 422 such that the fourth threaded part 424 is inserted through the fourth coupling hole 443. Thereafter, the third tube part 420 may be detachably coupled to the body 100, and the fourth tube part 440 may be detachably coupled to the third tube part 420, respectively, by nuts 800, which are fixed to each of the threaded parts 170 and 424.

Here, a third sealing part 630 may be provided between the upper outer surface of the body 100 and the third flange 422, and a fourth sealing part 640 may be provided between the upper surface of the third flange 422 and the fourth flange 442. The first sealing part 630 and the second sealing part 640 may prevent gas leakage.

Figure 4:
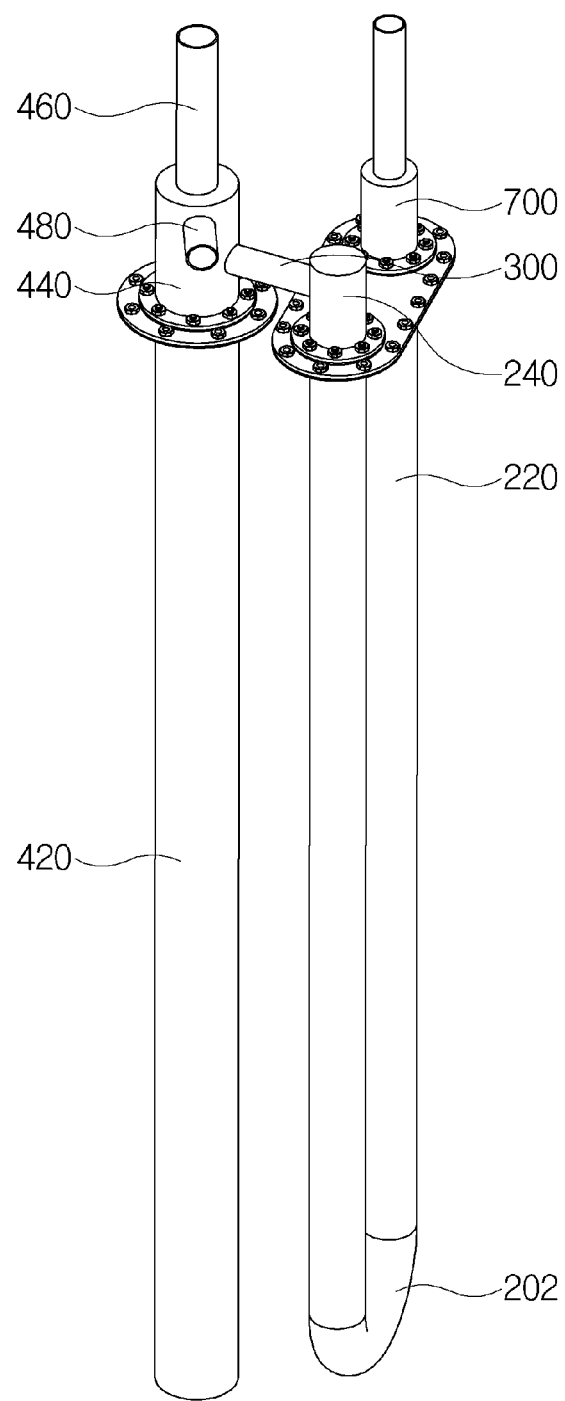
FIG. 4 is a perspective view separately illustrating the first catalyst tube and the second catalyst tube connected to each other in FIG. 3.

As illustrated in FIG. 4, in the present embodiment, the first tube part 220 of the first catalyst tube 200 is a U-shaped tube, and the second tube part 240 is a straight tube connected to a discharge end of the first tube part 220 in the U-shaped tube. The reaction time of the catalyst may become longer as the first tube part 220 is configured as the U-shaped tube. According to an embodiment, the U-shaped tube may include a heating part and a catalytic reforming part. Among the two elongated parts of the first tube part 220, the one having an inlet of the first tube part 220 may be the heating part and the other one connected to the second tube 240 part may be the catalytic forming part. In the heating part, hydrocarbon gas is preheated before undergoing catalytic reforming, and in the catalytic reforming part, catalytic reforming is performed. Here, a U-turn section 202 of the U-shaped tube, which connects the heating part and the catalytic reforming part, preferably extends along a circumferential direction of the body 100.

Depending on an embodiment, an inlet tube 700 connected to an inlet end of the U-shaped tube (i.e., the first tube part 220) and detachably installed in the body 100 may be further included. Hydrocarbon gas and steam may be injected into the first tube part 220 of the first catalyst tube through the inlet tube 700. At this time, the inlet tube 700 includes a fifth flange 720, and as illustrated in FIGS. 1 and 5. The fifth flange 720 is coupled to the upper surface of the first flange 222. The first flange 222 has an elliptical shape or a long hole and a large area such that both the second flange 242 and the fifth flange 720 can be coupled to the first flange 222.

To this end, on the upper surface of the first flange, a fifth threaded part 225 is protrudingly formed, which is inserted into a fifth coupling hole 722. The fifth coupling hole 722 is formed in the fifth flange 720. As a result, the fifth flange 720 is seated on the first flange 222 such that the fifth threaded part 225 is inserted through the fifth coupling hole 722. Thereafter, the inlet tube 700 may be detachably coupled to first tube part 220 by a nut fixed to the threaded part 225. However, the present disclosure is not limited thereto, and it is apparent that the inlet tube 700 and the second tube part 240 of the first catalyst tube 200 may be integrally formed.

In addition, in the present embodiment, the third tube part 420 and the fourth tube part 440 of the second catalyst tube are both straight tubes. The second catalyst tube 400 may further include a straight inner tube 460 disposed on an inside of the third tube part 420 and the fourth tube part 440. The inner tube 460 is fixed to the fourth tube part 440, and extends beyond and outward of an upward end of the fourth tube part 440 by passing through the fourth tube part 440 in the longitudinal direction. In addition, the inner tube 460 extends along a longitudinal direction on the inside of the third tube part 420. The downward end of the inner tube 460 does not contact a downward end of the third tube part 420, and forms a certain space therebetween. In this way, gas between the third tube part 420 and the inner tube 460 may flow into the inner tube 460. The inner tube 460 and the third/fourth tube parts 420, 440 are in a cylindrical shape, having the central axis. The inner diameters of the third tube part 420 and the fourth tube part 440 may be the same and larger than the outer diameter of the inner tube 460.

As a result, the hydrocarbon gas and steam injected into the inlet tube 700 are subjected to primary reforming while passing through the first tube part 220, then pass through the second tube part 240 and the connection tube 300, and flow into a space between the fourth tube part 440 and the inner tube 460. Thereafter, the gas subjected to the primary reforming and steam flow into a space between the third tube part 420 and the inner tube 460 to go through secondary reforming, flow into the inner tube 460, and then can be discharged. A syngas discharge part (not illustrated) to allow the syngas to be discharged therethrough may be formed in the inner tube 460.

According to the present disclosure, the second tube part 240, the fourth tube part 440, and the connection tube 300 are detachably installed in the body 100 from an outside of the body 100. Also, both the first tube part 220 and the third tube part 420 are also detachably installed in the body 100. The first, second, third, and fourth tube parts may be detached from the body 100, by just loosening or unscrewing nuts 800 and without opening an upper part of the body 100. Accordingly, there is no need to open an upper part of the body and separate the entire catalyst tubes in order to replace the catalyst. That is, the catalyst may be easily replaced without the need to open the upper part of the body, since it is possible to separate only the first catalyst tube 220 or the second catalyst tube 240 therefrom individually, allowing for straight forward replace without disassembling the entire system. Further, since the connection tube 300 is located outside the body 100, differential pressure loss in the combustion gas passage can be reduced.

Hereinafter, a catalyst replacement method with respect to the combined reformer according to the present embodiment will be described.

First, in order to replace the catalyst, the second tube part 240 of the first catalyst tube 200, the fourth tube part 440 of the second catalyst tube 400, and the connection tube 300 may be separated from the body 100 integrally. Then, the catalyst tube requiring replacement of the catalyst is separated. For example, when it is necessary to replace the catalyst in the second catalyst tube 400, the third tube part 420 of the second catalyst tube 400 is separated from the body 100. At this time, the separation is performed by loosening the nuts 800 coupled to each threaded part as described above.

The catalyst is removed from the third tube part 420 separated from the body 100. For example, the catalyst may be removed by inverting the third tube part 420 upside down. Thereafter, the third tube part 420 separated from the body 100 is coupled to the body 100 again, and the second tube part 240, the fourth tube part 440 and the connection tube 300 are integrally coupled to the body 100 again. As a result, the catalyst may be injected again into the second catalyst tube from which the catalyst has been removed. In this case, a catalyst injection inlet 480 may be provided in the fourth tube part 440 to easily inject the catalyst between the inner tube 460 and the third tube part 420.

If it is necessary to replace the catalyst in the first catalyst tube 200, the first tube part 220 may be separated after separating the inlet tube 700 from the body 100 in addition to separating the second tube part 240, the fourth tube part 440 and the connection tube 300 integrally from the body 100.

According to an embodiment, hydrocarbon gas including methane and carbon dioxide (e.g., biogas) and steam may be supplied to the first catalyst tube 200. Hereinafter, a reforming reaction will be described, which is performed in the first catalyst tube 200 and the second catalyst tube 400 when biogas and steam are supplied to the first catalyst tube 200. The structure of the combined reformer except for the reforming reaction is the same as described above. Therefore, the catalyst replacement method may be applied in the same way.

When biogas and steam are supplied to the first catalyst tube 200, methane can be reformed into syngas containing hydrogen and carbon monoxide by reacting with steam (wet reforming) in the first catalyst tube 200, through a reaction represented by Reaction Formula 3, and methane can be reformed into syngas containing hydrogen and carbon monoxide by reacting with carbon dioxide (dry reforming) in the second catalyst tube 400 through a reaction represented by Reaction Formula 4.

$CH_4+H_2O \rightarrow CO+3H_2$ <span></span> Reaction Formula 3

$CH_4+CO_2 \rightarrow 2CO+2H_2$ <span></span> Reaction Formula 4

In this case, the first temperature T1, which is the reaction temperature of the first catalyst tube 200, can range from about 450° C. to 650° C., and a catalyst for wet reforming methane is used. The second temperature T2, which is the reaction temperature of the second catalyst tube 400, can range from about 650° C. to 850° C., and a catalyst for dry reforming methane is used.

Here, it is described that the wet reforming reaction of methane is performed in the first catalyst tube 200, however, the wet reforming reaction of methane may be performed in a wide temperature range, and accordingly, may be partially performed in the second catalyst tube 400.

As described above, the hydrocarbon gas (here, biogas containing methane and carbon dioxide) and steam may be reformed into syngas through the wet reforming reaction and the dry reforming reaction, while flowing through the first catalyst tube 200 and the second catalyst tube 400 sequentially. The same as the above, biogas and steam injected into the inlet tube 700 go through a first reforming while passing through the first tube part 220, and then, are introduced into the space formed between the fourth tube part 440 and the inner tube 460 by passing through the second tube part 240 and the connection tube 300. Thereafter, the gas subjected to the first reforming and steam flow into the space between the third tube part 420 and the inner tube 460 to go through the second reforming, flow into the inner tube 460, and then can be discharged. In this case, a carbon dioxide removal apparatus is not required since carbon dioxide removal process is not necessary before the biogas is supplied to the reformer. The biogas can be directly fed into the reformer without any additional processing or carbon dioxide removal step.

Figure 6:
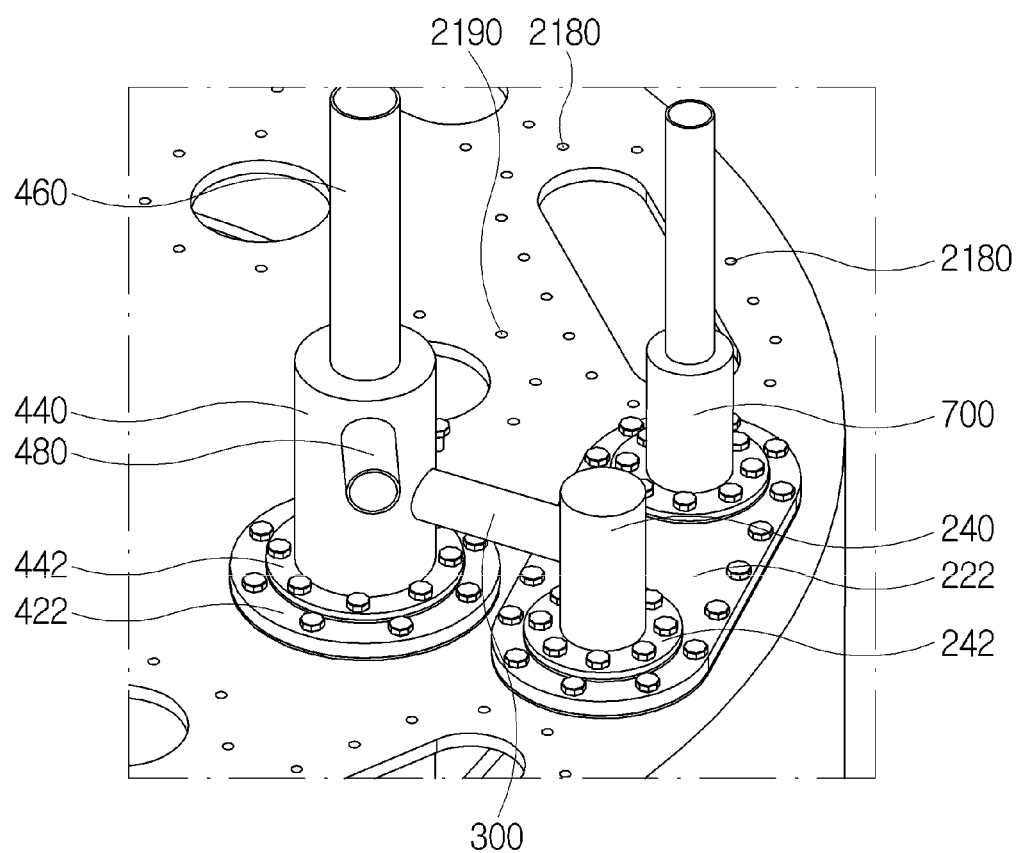
FIG. 6 is an enlarged perspective view illustrating a state in which only the first catalyst tube and the second catalyst tube connected to each other in a combined reformer according to a second embodiment of the present disclosure are installed in the body.
Figure 7:
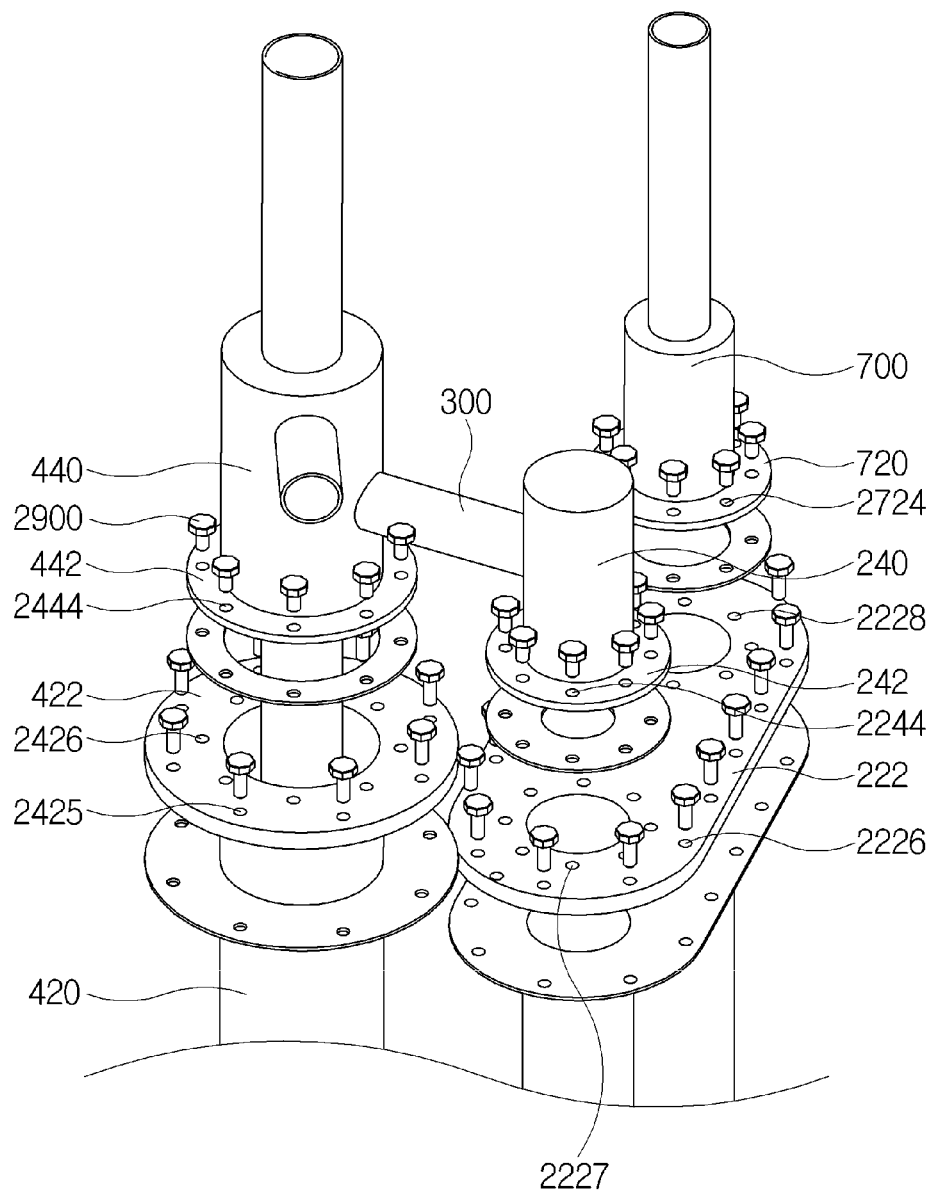
FIG. 7 is an enlarged exploded perspective view illustrating a state in which configurations of the first catalyst tube and the second catalyst tube connected to each other in FIG. 6 are separated.

Next, referring to FIGS. 6 and 7, a combined reformer according to a second embodiment of the present disclosure will be described. The combined reformer according to the second embodiment includes the same configuration as the combined reformer according to the first embodiment, except for a partial difference in the structure where the first catalyst tube 200 and the second catalyst tube 400 are detachably installed in the body 100.

In the structure where the first catalyst tube 200 is detachably installed in the body 100, the first flange 222 of the first tube part 220 is coupled to the upper outer surface of the body 100 (i.e., the upper surface of the upward end plate of the body 100), and the second flange 242 of the second tube part 240 is coupled to the upper surface of the first flange 222, like the first embodiment. In addition, in the structure where the second catalyst tube 400 is detachably installed in the body 100, the third flange 422 of the third tube part 420 is coupled to the upper outer surface of the body 100 (or, the upper surface of the upward end plate of the body 100), and the fourth flange 442 of the fourth tube part 440 is coupled to the upper surface of the third flange 422, like the first embodiment. However, the body 100 does not include the first threaded part 160 and the third threaded part 170 of the first embodiment. Also, the first catalyst tube 200 does not include the first coupling hole 223, the second threaded part 224, the fifth threaded part 225 and the second coupling hole 243 of the first embodiment. In addition, the second catalyst tube 400 does not include the third coupling hole 423, the fourth threaded part 424, and the fourth coupling hole 443 of the first embodiment. Similarly, the inlet tube 700 does not include the fifth coupling hole 722 of the first embodiment. Moreover, nuts 800 of the first embodiment are not included.

In the present embodiment, in the first flange 222, a first fastening hole 2226 is formed, through which a bolt 2900 passes. Also, on the upper outer surface of the body 100, a first fastening groove 2180 is formed to be aligned with the first fastening hole 2226. In addition, in the second flange, a second fastening hole 2244 is formed, through which a bolt 2900 passes, and on the upper surface of the first flange 222, a second fastening groove 2227 to be aligned with the second fastening hole 2244.

As a result, after the first flange 222 is seated on the body 100 such that the first fastening hole 2226 and the first fastening groove 2180 are disposed to be aligned with each other, the bolt 2900 is fastened to the first fastening hole 2226 and the first fastening groove 2180 at the same time. After the second flange 242 is seated on the first flange 222 such that the second fastening hole 2244 and the second fastening groove 2227 are disposed to be aligned with each other, the bolt 2900 is fastened to the second fastening hole 2244 and the second fastening groove 2227 at the same time. This enables the first tube part 220 and the second tube part 240 to be detachably coupled to the body 100, respectively.

Similarly, a third fastening hole 2425 through which the bolt 2900 passes is formed in the third flange 422, a third fastening groove 2190 is formed on an upper outer surface of the body 100 to be aligned with the third fastening hole 2425. In addition, a fourth fastening hole 2444 through which the bolt 2900 passes is formed in the fourth flange 442, and a fourth fastening groove 2426 is formed on the upper surface of the third flange 422 to be aligned with the fourth fastening groove 2444.

As a result, after the third flange 422 is seated on the body 100 such that the third fastening hole 2425 and the third fastening groove 2190 are disposed to be aligned with each other, the bolt 2900 is fastened to the third fastening hole 2425 and the third fastening groove 2190 at the same time. After the fourth flange 442 is seated on the third flange 422 such that the fourth fastening hole 2444 and the fourth fastening groove 2426 are disposed to be aligned with each other, the bolt 2900 is fastened to the fourth fastening hole 2444 and the fourth fastening groove 2426 at the same time. This enables the third tube part 420 and the fourth tube part 440 to be detachably coupled to the body 100, respectively.

Besides, the fifth flange 720 of the inlet tube 700 is coupled to the upper surface of the first flange 222. To this end, a fifth fastening hole 2724 through which the bolt 2900 passes is formed in the fifth flange 720, and a fifth fastening groove 2228 is formed on the upper surface of the first flange 222 to be aligned with the fifth fastening hole 2724. As a result, after the fifth flange 720 is seated on the first flange 222 such that the fifth fastening hole 2724 and the fifth fastening groove 2228 are disposed to be aligned with each other, the bolt 2900 is fastened to the fifth fastening hole 2724 and the fifth fastening groove 2228 at the same time. This enables the inlet tube 700 to be detachably coupled to the body 100.

Figure 8:
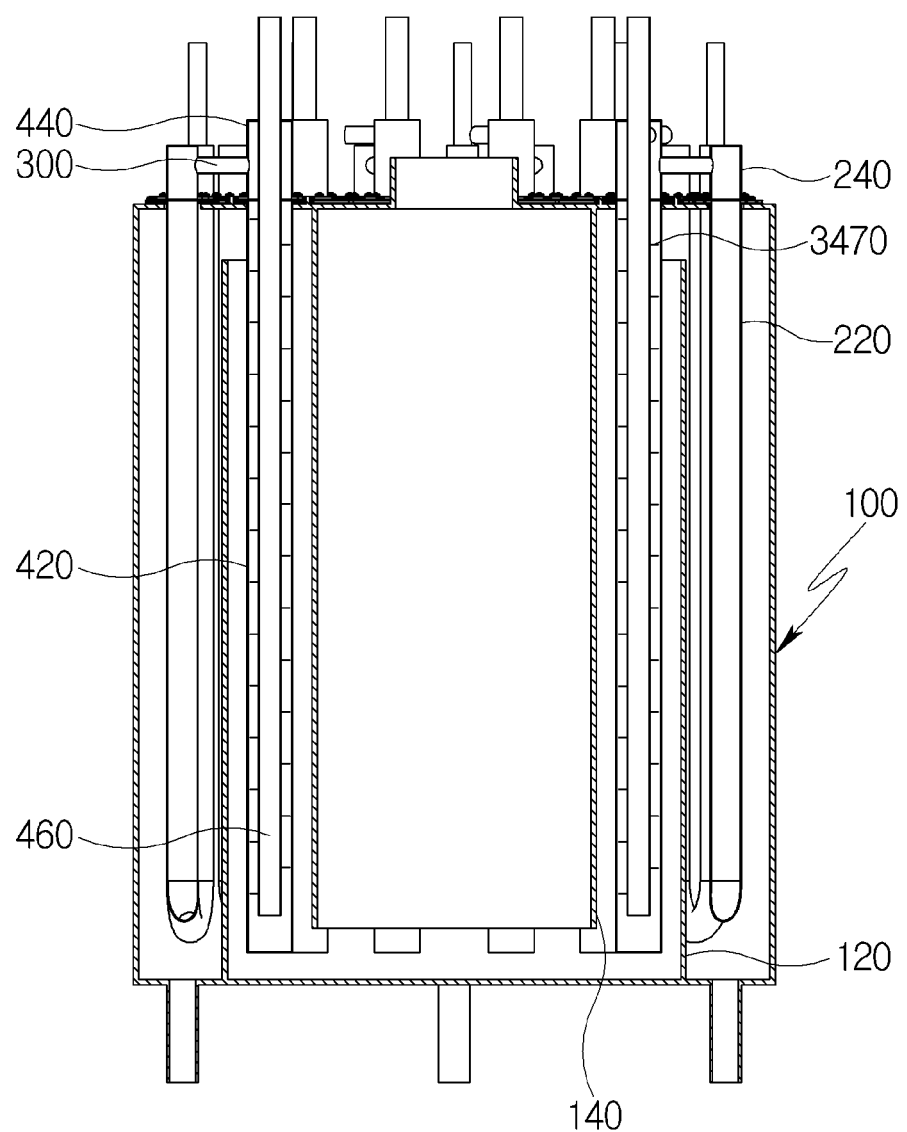
FIG. 8 is a cross-sectional view of a combined reformer according to a third embodiment of the present disclosure.

Next, referring to FIG. 8, a combined reformer according to a third embodiment of the present disclosure will be described. The combined reformer according to the third embodiment includes the same as the combined reformer according to the first embodiment, but further includes a fin 3470.

In the present embodiment, the fin 3470 is provided on an outer surface of the inner tube 460 along a longitudinal direction. The fin 3470 may be a helical shaped fin winding along a longitudinal direction on the outer surface of the inner tube 460. In this way, as the gas passing through between the inner tube 460 and the third tube part 420 of the second catalyst tube flows along the helical shaped fin 3470, the catalyst reaction time may become longer, and a temperature deviation inside the tube is reduced since the gas flows along all surfaces of the tube.

Figure 9:
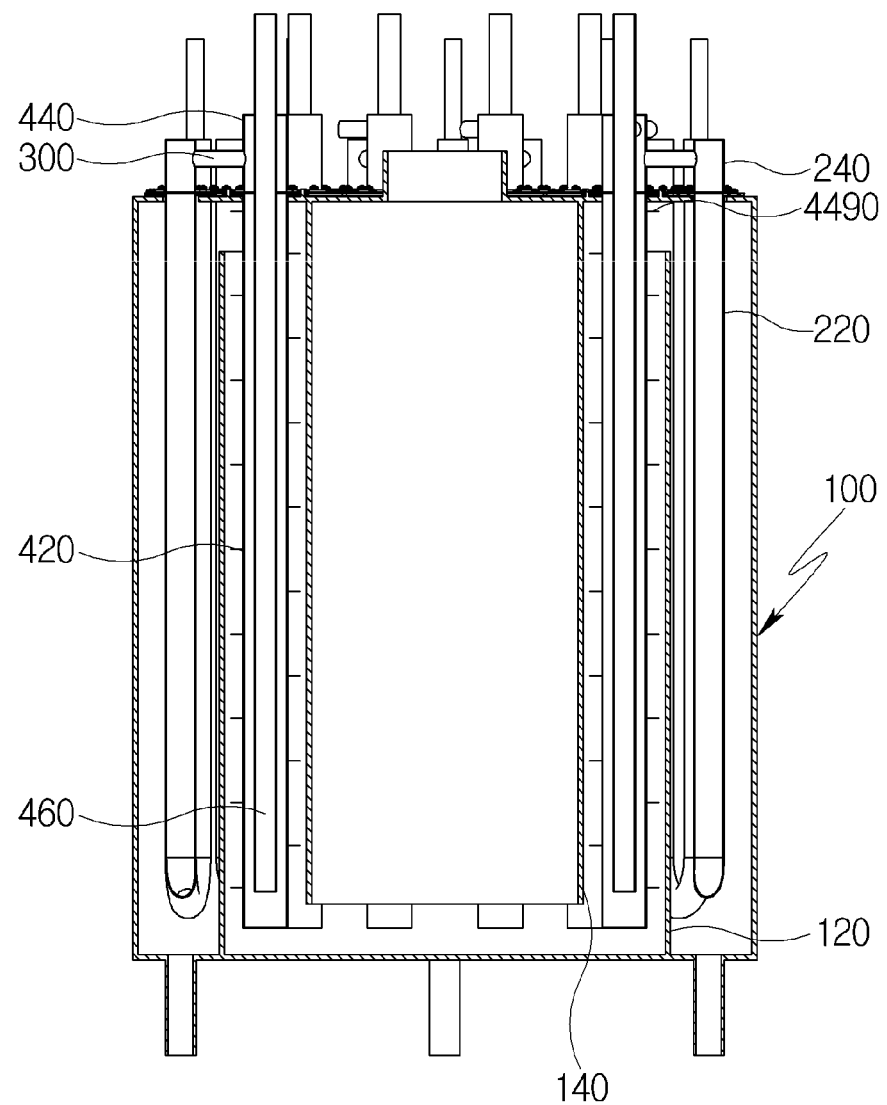
FIG. 9 is a cross-sectional view of a combined reformer according to a fourth embodiment of the present disclosure.
Figure 10:
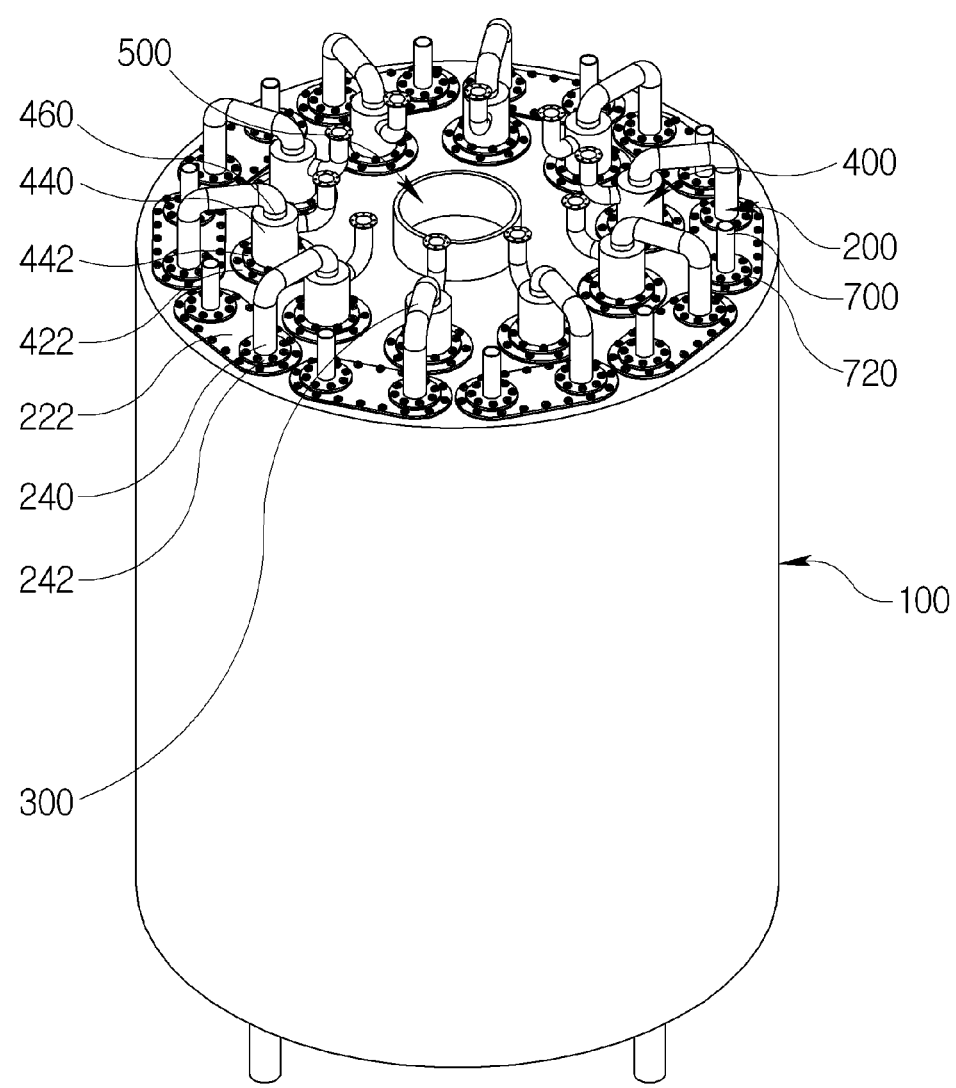
FIG. 10 is a cross-sectional view of a combined reformer according to a fifth embodiment of the present disclosure.
Figure 11:
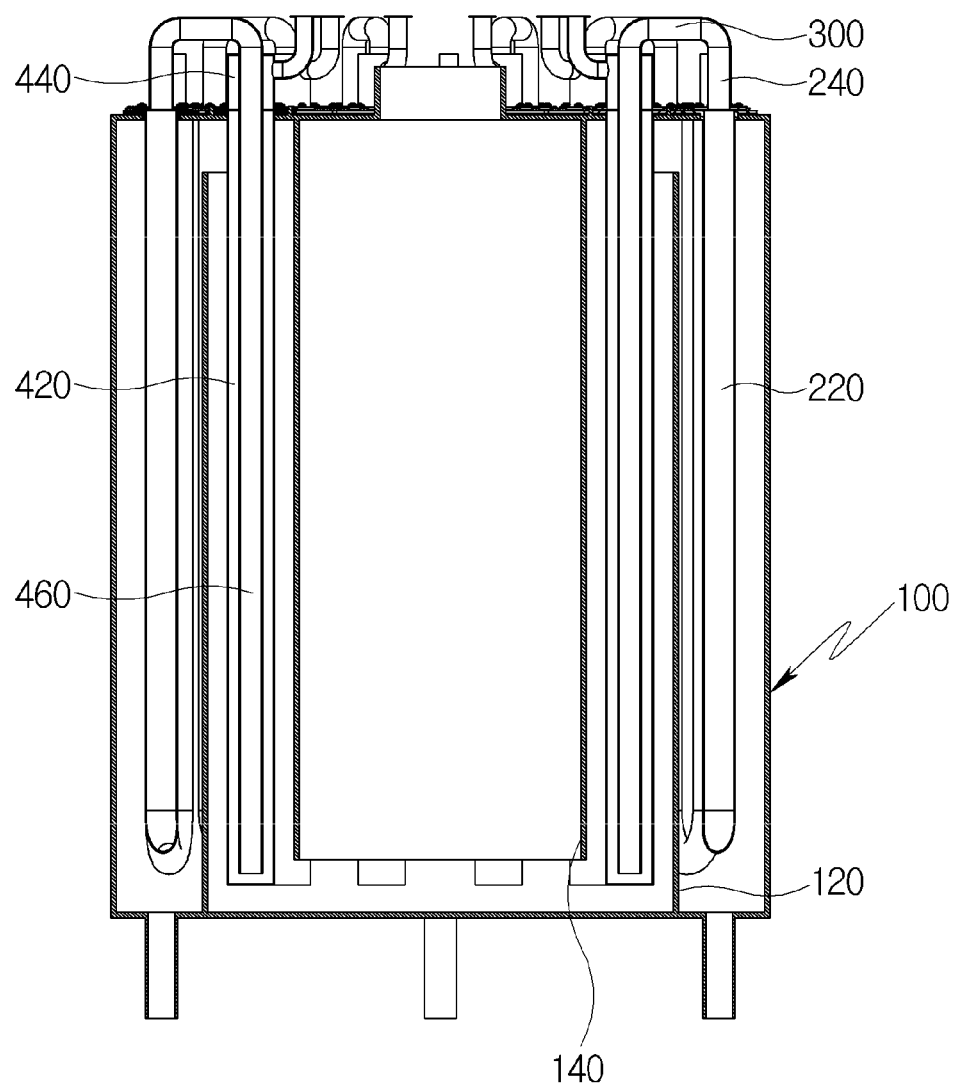
FIG. 11 is a vertical cross-sectional view of FIG. 10.
Figure 12:
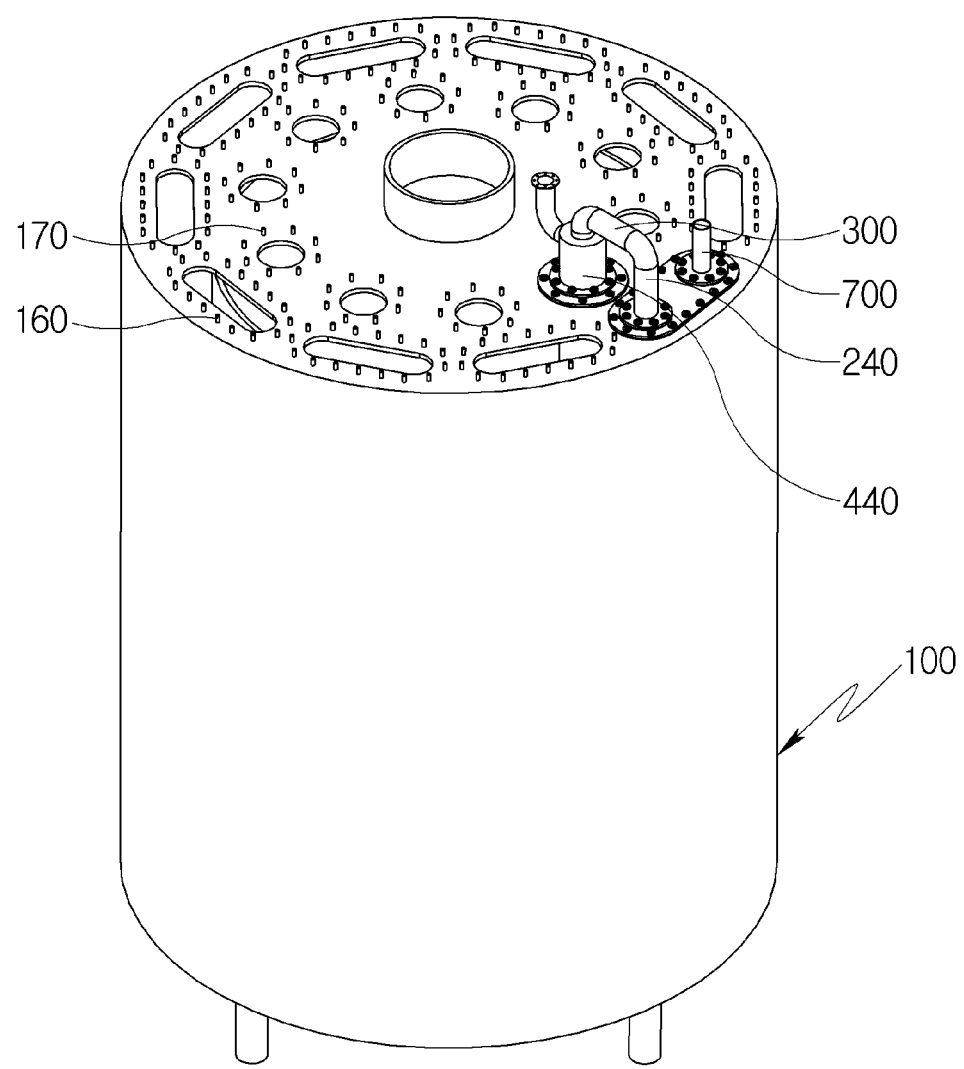
FIG. 12 is a perspective view illustrating a state in which only the first catalyst tube and the second catalyst tube connected to each other in FIG. 10 are installed in the body.
Figure 13:
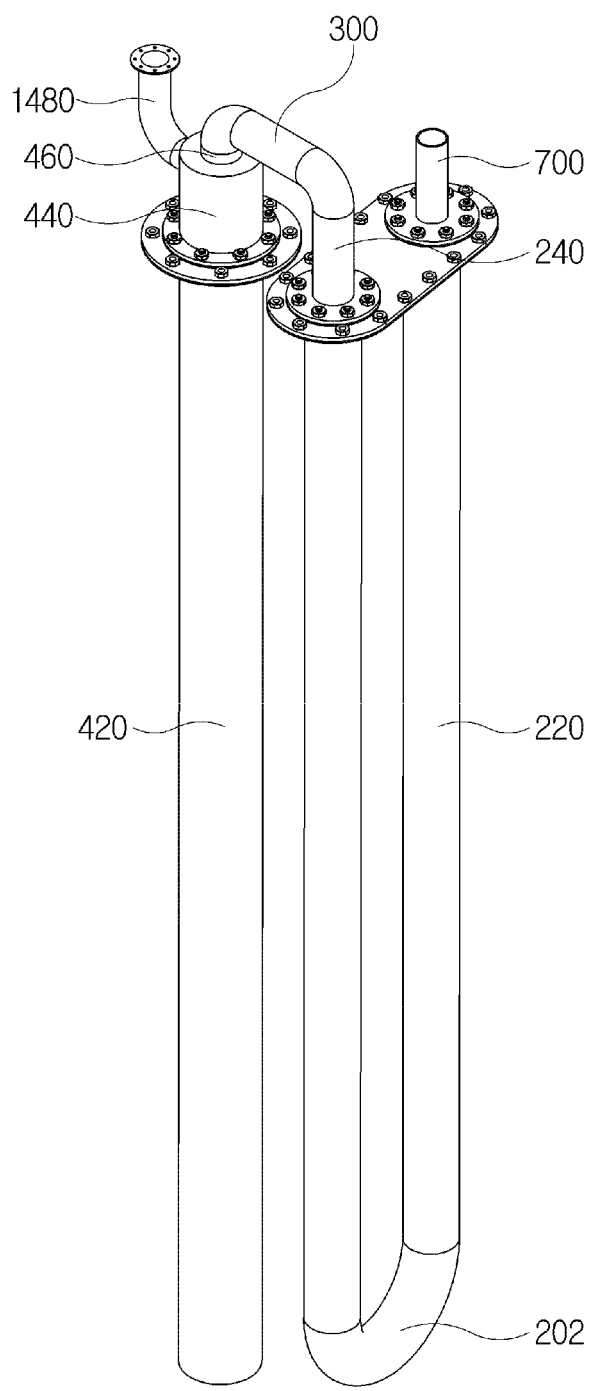
FIG. 13 is a perspective view separately illustrating the first catalyst tube and the second catalyst tube connected to each other in FIG. 12.
Figure 14:
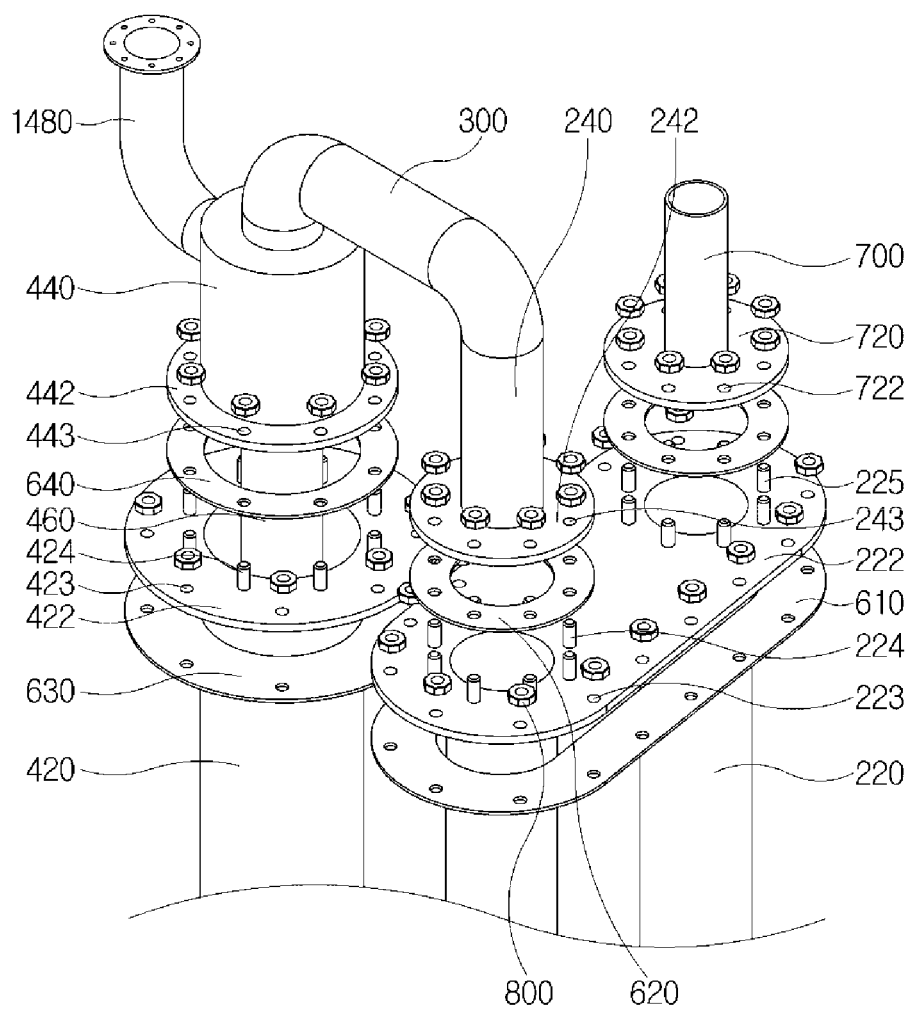
FIG. 14 is an enlarged exploded perspective view illustrating a state in which configurations in FIG. 13 are separated.

In addition, referring to FIG. 9, a combined reformer according to a fourth embodiment will be described. The combined reformer according to the fourth embodiment includes the same as the combined reformer according to the first embodiment, but further includes a fin 4490.

In the present embodiment, the fin 4490 is provided on an outer surface of the third tube part 420 of the second catalyst tube along a longitudinal direction. The fin 4490 may be a helical shaped fin winding along a longitudinal direction on the outer surface of the third tube part 420. According to an embodiment, a plurality of fins may be formed by extending vertically long along a longitudinal direction on the outer surface of the third tube part 420 and formed in a way that each of which is spaced apart with equal intervals along a circumferential direction of the third tube part 420 and provided side by side with one another. In this way, a heat transfer surface of the third tube part 420 that exchanges heat with the combustion gas is increased so that an amount of heat absorption can be increased, and the combustion gas flows along all surfaces of the third tube part 420 while flowing along the helical shaped fin 4490, thereby the temperature deviation within the tube is reduced.

Next, referring to FIGS. 10 to 14, a combined reformer according to a fifth embodiment of the present disclosure will be described.

The combined reformer according to the fifth embodiment of the present disclosure includes the body 100, the first catalyst tube 200, the connection tube 300, the second catalyst tube 400, and the combustion unit 500. Here, except that the connection tube 300 connects the first catalyst tube 200 and the inner tube 460 of the second catalyst tube, the rest of the configurations are the same as those described in the first embodiment. Therefore, the difference will be mainly described and redundant description will be omitted.

In the present embodiment, the first catalyst tube 200 includes the first tube part 220 and the second tube part 240, the second catalyst tube 400 includes the third tube part 420, the fourth tube part 440, and the inner tube 460. The inner tube 460 is disposed on an inside of the third tube part 420 and the fourth tube part 440 and fixed in the fourth tube part 440, like the previous embodiments.

At this time, the connection tube 300 connects the second tube part 240 of the first catalyst tube and the inner tube 460 of the second catalyst tube to each other from an outside of the body 100. In the present embodiment, the inner tube 460 passes through the fourth tube part 440 to extend outward beyond the upper end plate of the body 100, and is connected to the connection tube 300 from an outside of the fourth tube part 440. The second tube part 240 of the first catalyst tube, the fourth tube part 440 of the second catalyst tube, the inner tube 460, and the connection tube 300 may be fixed to each other and integrally detachable from the body 100. The first tube part 220 of the first catalyst tube 200 and the third tube part 420 of the second catalyst tube 400 are installed to be detachable, respectively, from the body 100.

The structure that the first catalyst tube 200 installed to be detachable from the body 100 and the structure that the second catalyst tube 400 installed to be detachable from the body 100 are the same as described above.

As a result, the hydrocarbon gas and steam injected into the inlet tube 700 are subjected to primary reforming while passing through the first tube part 220. The hydrocarbon gas then passes through the second tube part 240 and the connection tube 300 and flow into the inner tube 460. Thereafter, the gas reformed through the primary reforming and steam flow into a space between the third tube part 420 and the inner tube 460 to go through secondary reforming, then flow into a space between the fourth tube part 440 and the inner tube 460, and then can be discharged. A syngas discharge part 1480 to allow the syngas to be discharged therethrough may be formed in the fourth tube part 440. The syngas discharge part 1480 may serve as a catalyst injection inlet into which the catalyst is injected as described in a catalyst replacement method below.

According to the present disclosure, the second tube part 240, the fourth tube part 440, the inner tube 460 and the connection tube 300 may be integrally fixed and detachably installed in the body 100 from an outside of the body 100. Also, both the first tube part 220 and the third tube part 420 are detachably installed in the body 100, and accordingly, there is no need to open an upper part of the body and separate the entire catalyst tubes in order to replace the catalyst. That is, the catalyst may be easily replaced without requiring to open the upper part of the body, since it is possible to separate only the first catalyst tube or the second catalyst tube therefrom. Further, since the connection tube 300 is located outside the body 100, differential pressure loss in the combustion gas passage can be reduced.

Hereinafter, a catalyst replacement method with respect to the combined reformer according to the present embodiment will be described.

First, in order to replace the catalyst, the second tube part 240 of the first catalyst tube 200, the fourth tube part 440 of the second catalyst tube 400, the inner tube 460 and the connection tube 300 may be integrally separated from the body 100. Then, the catalyst tube requiring replacement of the catalyst is separated.

For example, when it is necessary to replace the catalyst in the second catalyst tube 400, the third tube part 420 of the second catalyst tube is separated from the body 100. At this time, the separation is performed by loosening the bolt 2900 coupled to each of the flanges as described above. The catalyst is removed from the third tube part 420 separated from the body 100. For example, the catalyst may be removed by inverting the third tube part 420 upside down. Thereafter, the third tube part 420 separated from the body 100 is coupled to the body 100 again. Then, the second tube part 240, the fourth tube part 440, the inner tube 460, and the connection tube 300 are integrally coupled to the body 100 again. As a result, the catalyst may be injected again into the second catalyst tube from which the catalyst has been removed. At this time, the catalyst may be easily injected into between the inner tube 460 and the third tube part 420 through the syngas discharge part 1480 provided in the fourth tube part 440.

If it is necessary to replace the catalyst in the first catalyst tube 200, the first tube part 220 may be separated after separating the inlet tube 700 from the body 100 in addition to separating the second tube part 240, the fourth tube part 440, the inner tube 460 and the connection tube 300 integrally from the body 100.

Figure 15:
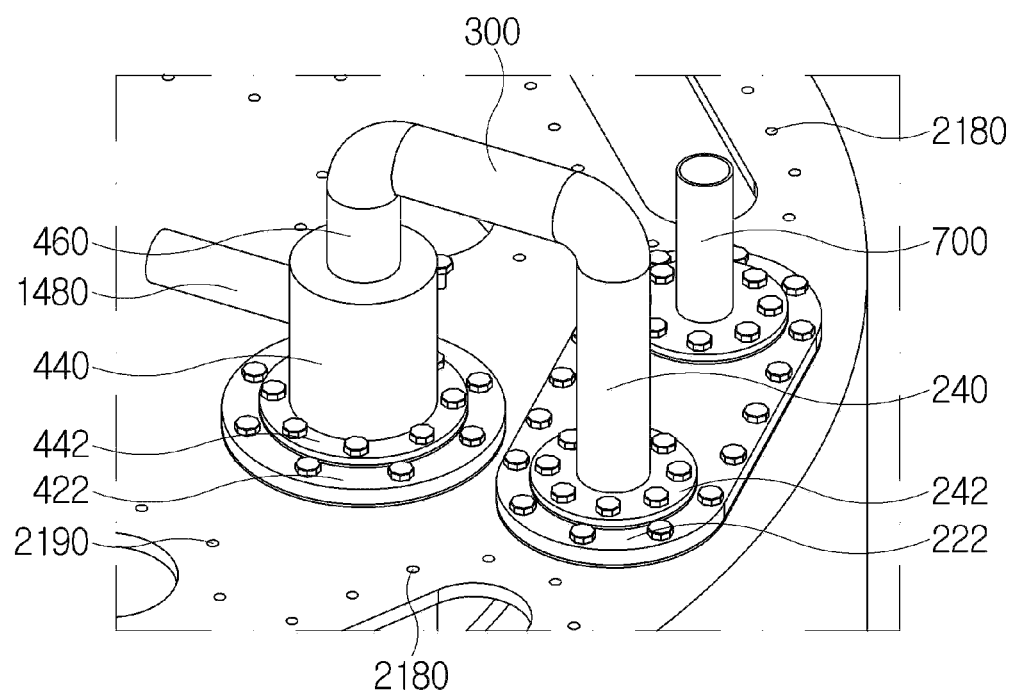
FIG. 15 is an enlarged perspective view illustrating a state in which only the first catalyst tube and the second catalyst tube connected to each other in a combined reformer according to a sixth embodiment of the present disclosure are installed in the body.
Figure 16:
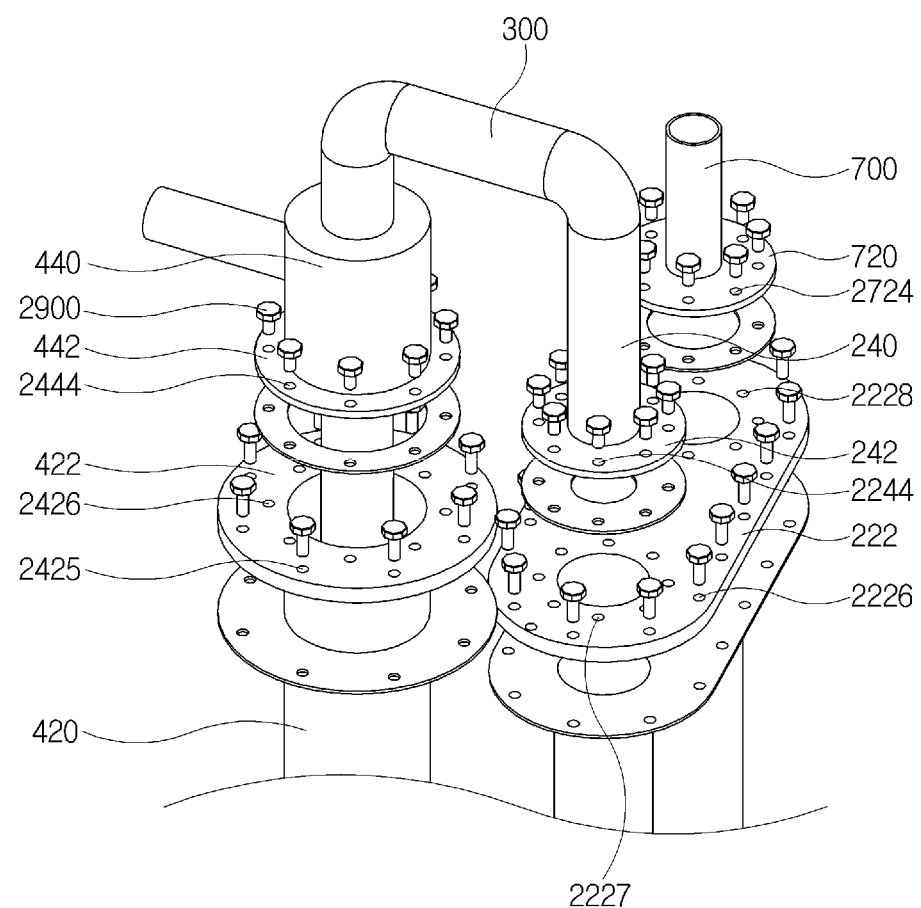
FIG. 16 is an enlarged exploded perspective view illustrating a state in which configurations of the first catalyst tube and the second catalyst tube connected to each other in FIG. 15 are separated.

Next, referring to FIGS. 15 and 16, a combined reformer according to a sixth embodiment of the present disclosure will be described. In the combined reformer according to the sixth embodiment of the present disclosure, except that the connection tube 300 connects the first catalyst tube 200 and the inner tubes 460 of the second catalyst tube, the rest of the configurations are the same as those described in the second embodiment.

That is, like the structure where the first catalyst tube 200 and the second catalyst tube 400 installed detachable from the body 100 is changed from implementing the use of the threaded part, coupling holes, and nuts according to the first embodiments to the use of the fastening grooves, fastening holes, and bolts according to the second embodiment, the use of the threaded part, coupling holes, and nuts according to the fifth embodiment may be changed to use of fastening grooves, fastening holes, and bolts in this sixth embodiment.

Specifically, the use of the first threaded part 160, the first coupling hole 223, the second threaded part 224, the second coupling hole 243, the third threaded part 170, the third coupling hole 423, the fourth threaded part 424, the fourth coupling hole 443, the fifth threaded part 225, the fifth coupling hole 722, and the nut 800 may be changed to the use of the first fastening groove 2180, the first fastening hole 2226, the second fastening groove 2227, the second fastening hole 2244, the third fastening groove 2190, the third fastening hole 2425, the fourth fastening groove 2426, the fourth fastening hole 2444, the fifth fastening groove 2228, the fifth fastening hole 2724, and the bolt 2900.

Figure 17:
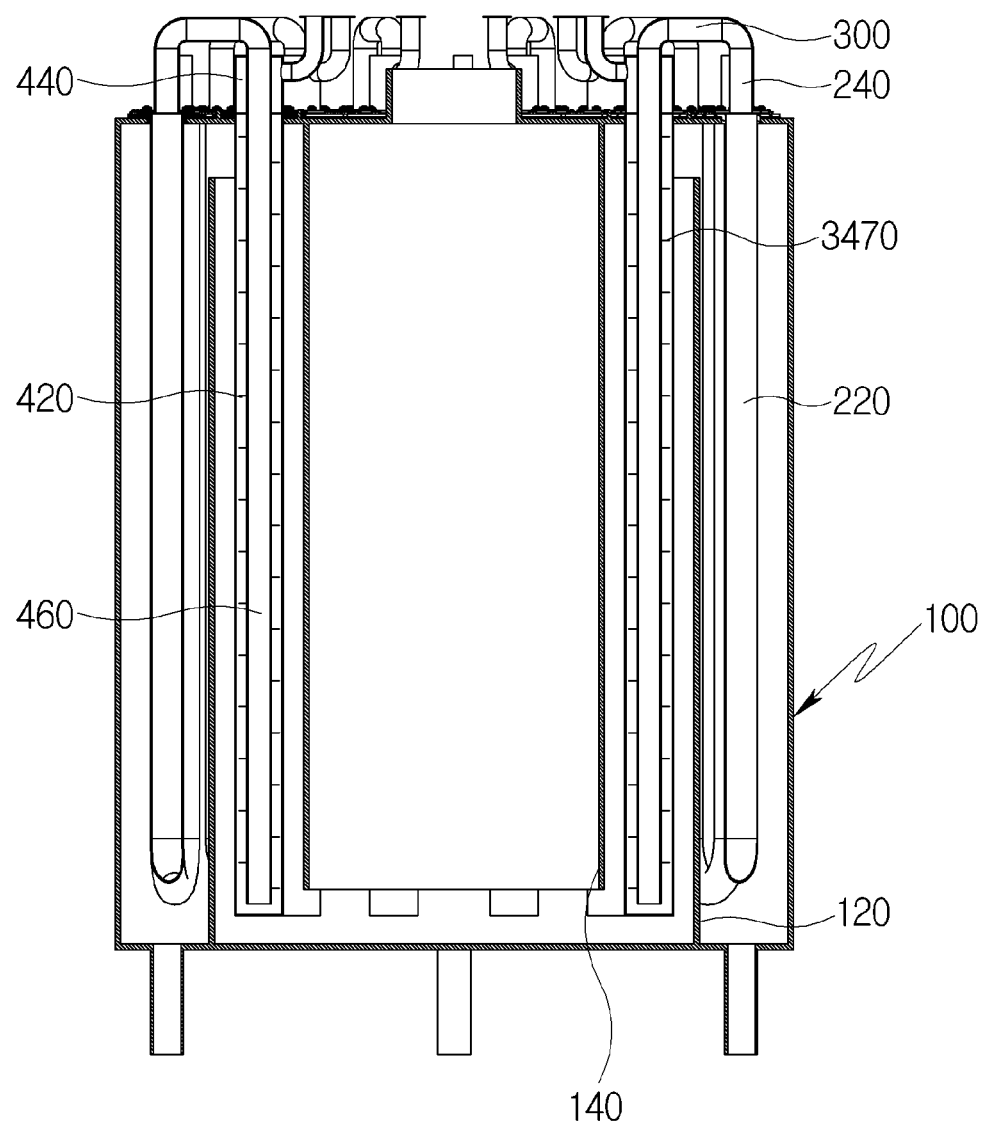
FIG. 17 is a cross-sectional view of a combined reformer according to a seventh embodiment of the present disclosure.

Next, referring to FIG. 17, a combined reformer according to a seventh embodiment of the present disclosure will be described. The combined reformer according to the seventh embodiment includes the same as the combined reformer according to the fifth embodiment, but further includes the fin 3470.

In the present embodiment, the fin 3470 is provided on an outer surface of the inner tube 460 along a longitudinal direction. The fin 3470 may be a helical shaped fin winding along a longitudinal direction on the outer surface of the inner tube 460. In this way, as the gas passing through between the inner tube 460 and the third tube part 420 of the second catalyst tube flows along the helical shaped fin 3470, the catalyst reaction time may become longer, and a temperature deviation inside the tube is reduced since the gas flows along all surfaces of the tube.

Figure 18:
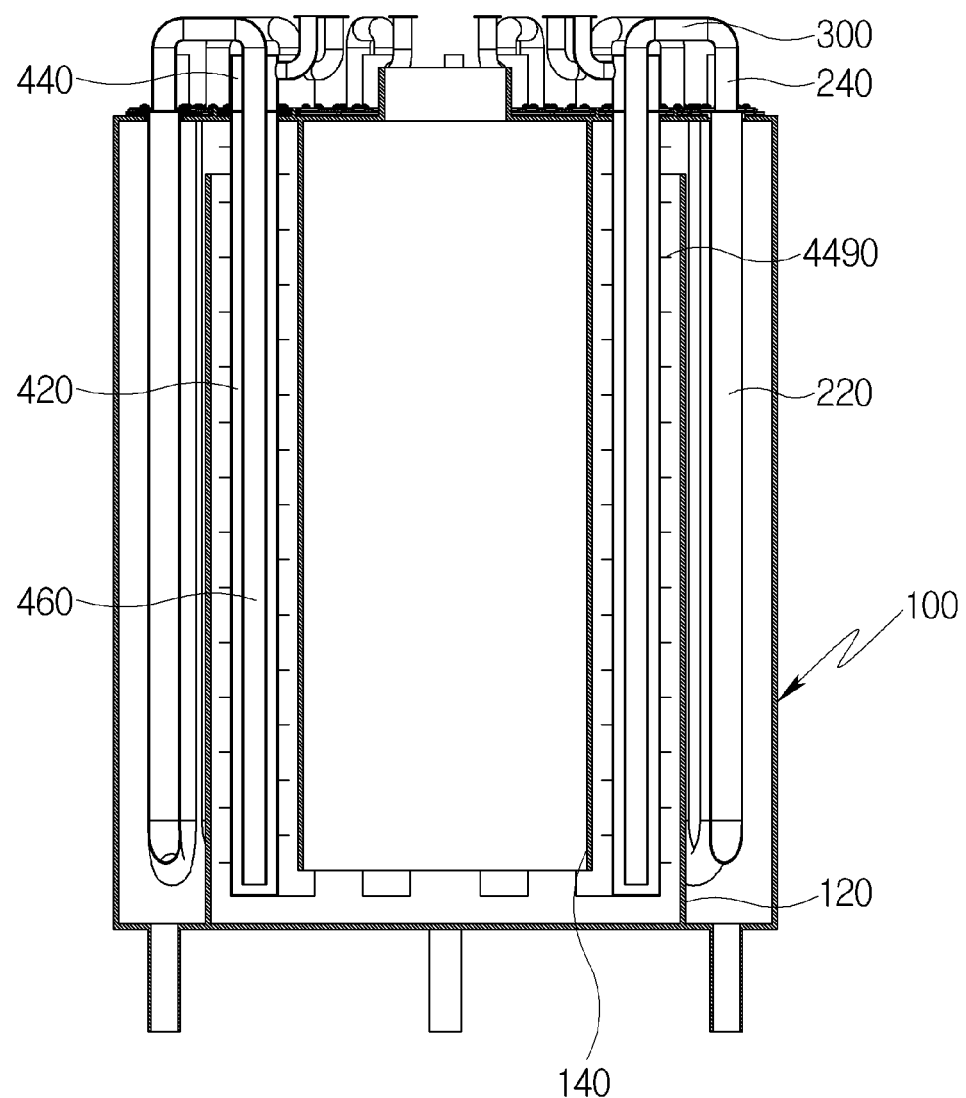
FIG. 18 is a cross-sectional view of a combined reformer according to an eighth embodiment of the present disclosure.

Lastly, referring to FIG. 18, a combined reformer according to an eighth embodiment of the present disclosure will be described. The combined reformer according to the eighth embodiment includes the same as the combined reformer according to the fifth embodiment, but further includes the fin 4490.

In the present embodiment, the fin 4490 is provided on an outer surface of the third tube part 420 of the second catalyst tube along a longitudinal direction. The fin 4490 may be a helical shaped fin winding along a longitudinal direction on the outer surface of the third tube part 420. According to an embodiment, a plurality of fins may be formed by extending vertically long along a longitudinal direction on the outer surface of the third tube part 420 and formed in a way that each of which is spaced apart with equal intervals along a circumferential direction of the third tube part 420 and provided side by side with one another. In this way, a heat transfer surface of the third tube part 420 that exchanges heat with the combustion gas is increased so that an amount of heat absorption can be increased, and the combustion gas flows along all surfaces of the third tube part 420 while flowing along the helical shaped fin 4490, thereby the temperature deviation within the tube is reduced.

The present disclosure is not limited to the above-described specific embodiments and descriptions, and various modifications may be made by those skilled in the art without departing from the gist of the present disclosure claimed in the claims. Such variations are within the protection scope of the present disclosure. Also, it is noted that any one feature of an embodiment of the present disclosure described in the specification may be applied to another embodiment of the present disclosure.

| Reference Numerals | |
|---|---|
| 100: body | 120: first wall |
| 140: second wall | 160: first threaded part |
| 170: third threaded part | 200: first catalyst tube |
| 202: U-turn section | 220: first tube part |
| 222: first flange | 223: first coupling hole |
| 224: second threaded part | 225: fifth threaded part |
| 240: second tube part | 242: second flange |
| 243: second coupling hole | 300: connection tube |
| 400: second catalyst tube | 420: third tube part |
| 422: third flange | 423: third coupling hole |
| 424: fourth threaded part | 440: fourth tube part |
| 442: fourth flange | 443: fourth coupling hole |
| 460: inner tube | 480: catalyst injection inlet |
| 500: combustion unit | 610: first sealing part |
| 620: second sealing part | 630: third sealing part |
| 640: fourth sealing part | 700: inlet tube |
| 720: fifth flange | 722: fifth coupling hole |
| 800: nut | 1480: syngas discharge part |
| 2180: first fastening groove | 2190: third fastening groove |
| 2226: first fastening hole | 2227: second fastening groove |
| 2228: fifth fastening groove | 2244: second fastening hole |
| 2425: third fastening hole | 2426: fourth fastening groove |
| 2444: fourth fastening hole | 2724: fifth fastening hole |
| 2900: bolt | |
| 3470, 4490: fin | |

What is claimed is:

1. A combined reformer, comprising:
a body;
a first catalyst tube disposed inside the body and reacting at a first temperature;
a second catalyst tube disposed inside the body and reacting at a second temperature higher than the first temperature;
a connection tube connecting the first catalyst tube and the second catalyst tube to each other; and
a combustion unit configured to supply heat to the first catalyst tube and the second catalyst tube,
wherein a portion of the first catalyst tube, a portion of the second catalyst tube, and the connection tube are detachably installed on an outer surface of the body from an outside of the body,
wherein the portion of the first catalyst tube, the portion of the second catalyst tube, and the connection tube are fixed to each other so as to be integrally separable from the body.

2. The combined reformer of claim 1,
wherein a remaining portion of the first catalyst tube and a remaining portion of the second catalyst tube are disposed inside the body and are detachably installed in the body, respectively.

3. The combined reformer of claim 2,
wherein a first tube part of the first catalyst tube disposed inside the body comprises a first flange, and a second tube part of the first catalyst tube disposed outside the body comprises a second flange, and
the first flange and the second flange are detachably coupled to the body.

4. The combined reformer of claim 3,
wherein the first flange is coupled to an upper outer surface of the body, and the second flange is coupled to an upper surface of the first flange.

5. The combined reformer of claim 4,
wherein, on the upper outer surface of the body, a first threaded part is protrudingly formed and inserted into a first coupling hole formed in the first flange, and, on the upper surface of the first flange, a second threaded part is protrudingly formed which is inserted into a second coupling hole formed in the second flange.

6. The combined reformer of claim 4,
wherein a first fastening hole through which a first bolt passes is formed in the first flange, a first fastening groove is formed on the upper outer surface of the body to be aligned with the first fastening hole, a second fastening hole through which a second bolt passes is formed in the second flange, and a second fastening groove is formed on the upper surface of the first flange to be aligned with the second fastening hole.

7. The combined reformer of claim 3,
wherein the first tube part of the first catalyst tube is a U-shaped tube, and the second tube part of the first catalyst tube is a straight tube connected to a discharge end of the U-shaped tube.

8. The combined reformer of claim 7, further comprising:
an inlet tube connected to an inlet end of the U-shaped tube and detachably installed in the body.

9. The combined reformer of claim 2,
wherein a third tube part of the second catalyst tube disposed inside the body comprises a third flange, and a fourth tube part of the second catalyst tube disposed outside the body comprises a fourth flange, and
the third flange and the fourth flange are detachably coupled to the body.

10. The combined reformer of claim 9,
wherein the third flange is coupled to the upper outer surface of the body, and the fourth flange is coupled to an upper surface of the third flange.

11. The combined reformer of claim 10,
wherein, on the upper outer surface of the body, a third threaded part is protrudingly formed and inserted into a third coupling hole formed in the third flange, and, on the upper surface of the third flange, a fourth threaded part is protrudingly formed and inserted into a fourth coupling hole formed in the fourth flange.

12. The combined reformer of claim 10,
wherein a third fastening hole through which a first bolt passes is formed in the third flange, a third fastening groove is formed on the upper outer surface of the body to be aligned with the third fastening hole, a fourth fastening hole through which a second bolt passes is formed in the fourth flange, and a fourth fastening groove is formed on the upper surface of the third flange to be aligned with the fourth fastening hole.

13. The combined reformer of claim 9,
wherein the second catalyst tube further comprises an inner tube disposed on an inside of the third tube part and the fourth tube part, and the inner tube is fixed to the fourth tube part.

14. The combined reformer of claim 13,
a gas introduced into a space between the fourth tube part and the inner tube of the second catalyst tube through the connection tube flows into a space between the third tube part and the inner tube of the second catalyst tube, and then flows into the inner tube.

15. The combined reformer of claim 13,
wherein the connection tube connects the first catalyst tube and the inner tube to each other, and
a gas introduced into the inner tube of the second catalyst tube through the connection tube flows into a space between the third tube part and the inner tube and then flows into a space between the fourth tube part and the inner tube.

16. The combined reformer of claim 13,
wherein a fin is provided on an outer surface of the inner tube or an outer surface of the third tube part along a longitudinal direction.

17. The combined reformer of claim 1,
wherein a hydrocarbon gas supplied to the plurality of first catalyst tubes comprises a hydrocarbon having two or more carbon atoms, and
in the plurality of first catalyst tubes, the hydrocarbon having two or more carbon atoms reacts with steam to be reformed into methane, and in the plurality of second catalyst tubes, methane reacts with steam to be reformed into syngas containing hydrogen and carbon monoxide.

18. The combined reformer of claim 1,
wherein the hydrocarbon gas supplied to the plurality of first catalyst tubes comprises methane and carbon dioxide, and
in the plurality of first catalyst tubes, methane reacts with steam to be reformed into syngas containing hydrogen and carbon monoxide, and in the plurality of second catalyst tubes, methane reacts with carbon dioxide to be reformed into syngas containing hydrogen and carbon monoxide.

19. A method for replacing a catalyst of the combined reformer according to claim 2, comprising:
separating the portion of the first catalyst tube, the portion of the second catalyst tube, and the connection tube from the body;
separating at least one from among a remaining portion of the first catalyst tube and a remaining portion of the second catalyst tube from the body;
removing a catalyst from at least one from among the remaining portion of the first catalyst tube and the remaining portion of the second catalyst tube separated from the body;
coupling at least one from among the remaining portion of the first catalyst tube and the remaining portion of the second catalyst tube separated from the body to the body again;
coupling the portion of the first catalyst tube, the portion of the second catalyst tube, and the connection tube to the body again; and
injecting a catalyst again into the first catalyst tube or the second catalyst tube from which a catalyst has been removed.

* * * * *